US011354410B2

(12) United States Patent
Gu et al.

(10) Patent No.: US 11,354,410 B2
(45) Date of Patent: Jun. 7, 2022

(54) PROTECTING AN ITEM OF SOFTWARE

(71) Applicant: Irdeto B.V., Hoofddorp (NL)

(72) Inventors: Yuan Xiang Gu, Ottawa (CA); Harold Johnson, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 1007 days.

(21) Appl. No.: 15/300,133

(22) PCT Filed: Mar. 30, 2015

(86) PCT No.: PCT/EP2015/056890
§ 371 (c)(1),
(2) Date: Sep. 28, 2016

(87) PCT Pub. No.: WO2015/150323
PCT Pub. Date: Oct. 8, 2015

(65) Prior Publication Data
US 2017/0213027 A1 Jul. 27, 2017

(30) Foreign Application Priority Data
Mar. 31, 2014 (GB) ..................................... 1405754

(51) Int. Cl.
*G06F 21/55* (2013.01)
*G06F 11/00* (2006.01)
(Continued)

(52) U.S. Cl.
CPC ...... *G06F 21/556* (2013.01); *G06F 2221/033* (2013.01)

(58) Field of Classification Search
CPC .................... G06F 21/556; G06F 2221/033
See application file for complete search history.

(56) References Cited

U.S. PATENT DOCUMENTS 6,668,325 B1 * 12/2003 Collberg ................. G06F 21/14
726/26
8,161,463 B2    4/2012 Johnson et al.
(Continued)

FOREIGN PATENT DOCUMENTS

CN       102760058 A    10/2012
EP       3 127 037 A1    2/2017
(Continued)

OTHER PUBLICATIONS

Impeding Malware Analysis Using Conditional Code Obfuscation, Monirul Sharig, Andrea Lanzi, Jonathan Giffin, Wenke Lee, Feb. 2008 (Year: 2008).*
(Continued)

*Primary Examiner* — Darshan I Dhruv
(74) *Attorney, Agent, or Firm* — Rimon PC; Marc Kaufman

(57) ABSTRACT

There is described a method of protecting an item of software so as to obfuscate a condition which causes a variation in control flow through a portion of the item of software dependent on whether the condition is satisfied, wherein satisfaction of the condition is based on evaluation of one or more condition variables. The method comprises: (i) modifying the item of software such that the control flow through said portion is not dependent on whether the condition is satisfied; and (ii) inserting a plurality of identity transformations into expressions in said portion of the modified item of software, wherein the identity transformations are defined and inserted such that, in the absence of tampering, they maintain the results of the expressions if the condition is satisfied and such that they alter the results of the expressions if the condition is not satisfied, wherein each identity transformation is directly or indirectly dependent on at least one of the one or more condition variables. New variables may be defined as part of this method. There are (Continued)

also described associated apparatuses, computer programs and the like.

25 Claims, 10 Drawing Sheets

(51) Int. Cl.
*G06F 12/14* (2006.01)
*G06F 12/16* (2006.01)

(56) References Cited

U.S. PATENT DOCUMENTS

| | | | | |
|---|---|---|---|---|
| 2005/0183072 A1* | 8/2005 | Horning | ............... | G06F 21/14 |
| | | | | 717/140 |
| 2008/0208560 A1* | 8/2008 | Johnson | ............... | H04L 9/002 |
| | | | | 703/22 |
| 2009/0296922 A1* | 12/2009 | Smeets | ............... | G06F 21/16 |
| | | | | 380/28 |
| 2010/0058301 A1* | 3/2010 | Myles | ............... | G06F 21/14 |
| | | | | 717/142 |
| 2010/0058303 A1* | 3/2010 | Myles | ............... | G06F 21/14 |
| | | | | 717/159 |
| 2010/0199354 A1* | 8/2010 | Eker | ............... | G06F 21/14 |
| | | | | 726/26 |
| 2010/0275190 A1* | 10/2010 | Ishizaki | ............... | G06F 8/458 |
| | | | | 717/149 |
| 2011/0035733 A1* | 2/2011 | Horning | ............... | G06F 21/14 |
| | | | | 713/190 |
| 2012/0246487 A1* | 9/2012 | Gu | ............... | G06F 21/51 |
| | | | | 713/190 |
| 2013/0097431 A1* | 4/2013 | Hriljac | ............... | G06F 8/52 |
| | | | | 713/189 |
| 2016/0055333 A1* | 2/2016 | Li | ............... | G06F 21/554 |
| | | | | 726/22 |
| 2016/0306973 A1* | 10/2016 | Bruekers | ............... | G06F 21/14 |

FOREIGN PATENT DOCUMENTS

| | | |
|---|---|---|
| GN | 106415579 A | 2/2017 |
| WO | 2013116918 A1 | 8/2013 |
| WO | 2015/150323 A1 | 10/2015 |

OTHER PUBLICATIONS

International Search Report and Written Opinion cited in corresponding International Application No. PCT/EP2015/056890 dated Jun. 24, 2015.
Hou T W et al., "Three Control flow obfuscation methods for Java Software", IEE Proceedings: Software, IEE, Stevenage, GB, vol. 153, No. 2, Apr. 19, 2006.
Monirul Sharif et al., "Impeding Malware Analysis Conditional Code Obfuscation", Jan. 1, 2008, retrieved from http://anubis.seclab.tuwien.ac.at/people/andrew/download/NDSS08.pdf retrieved May 7, 2015.
Examination Report cited in corresponding United Kingdom Application No. GB1405754.1 dated Oct. 23, 2014.
Communication pursuant to Rules 71(3) EPC and reference to Rule 39(1) EPC for European Application Serial No. 15714189.6, dated Nov. 11, 2017, 146 pages.
First Office Action received for Chinese Application Serial No. 201580028813.4 dated Oct. 15, 2018, 13 pages. (English Translation of OA not available).
International Preliminary Report on Patentability received in corresponding International Application No. PCT/EP2015/056890 dated Oct. 13, 2016, 7 pages.

* cited by examiner

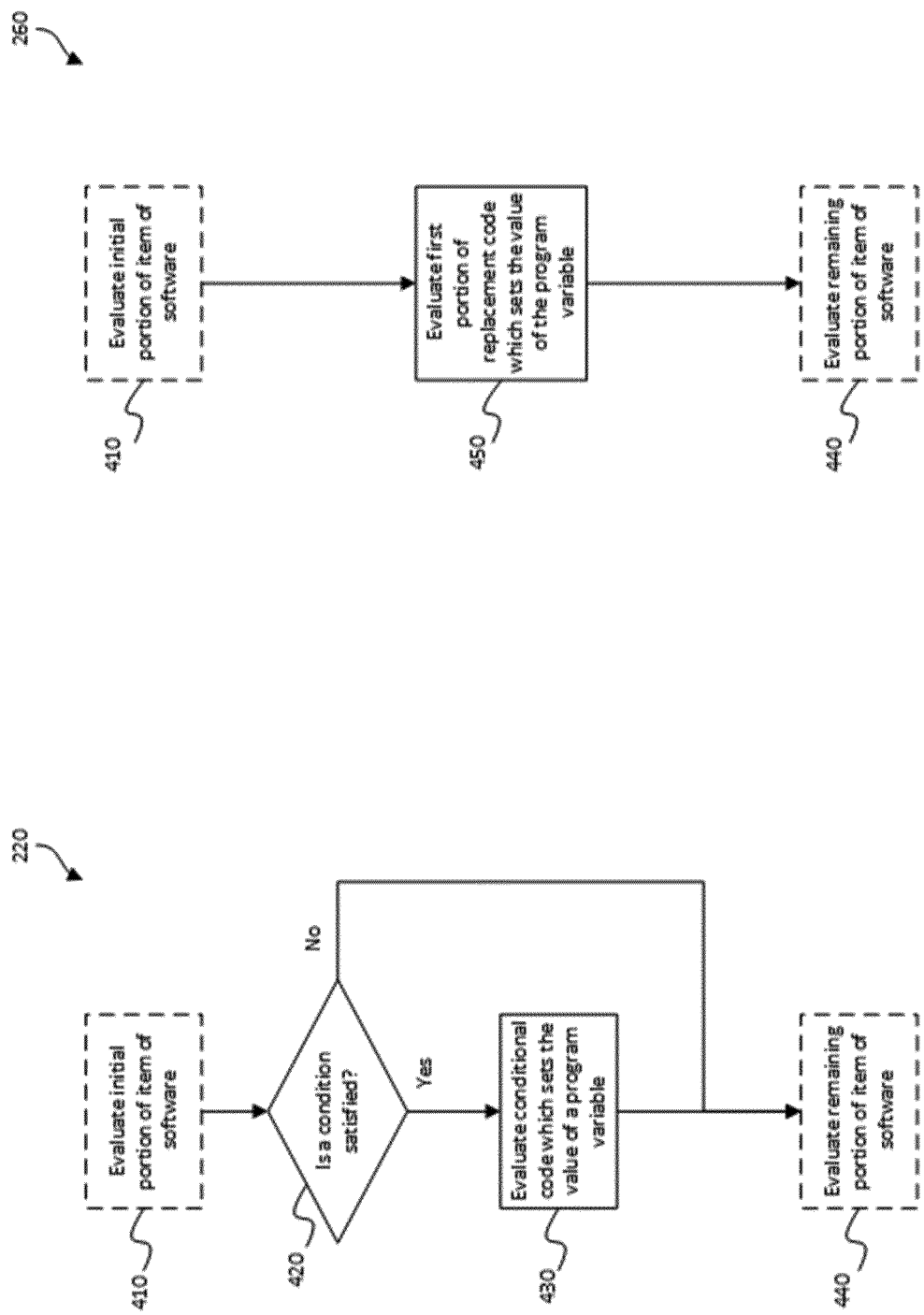

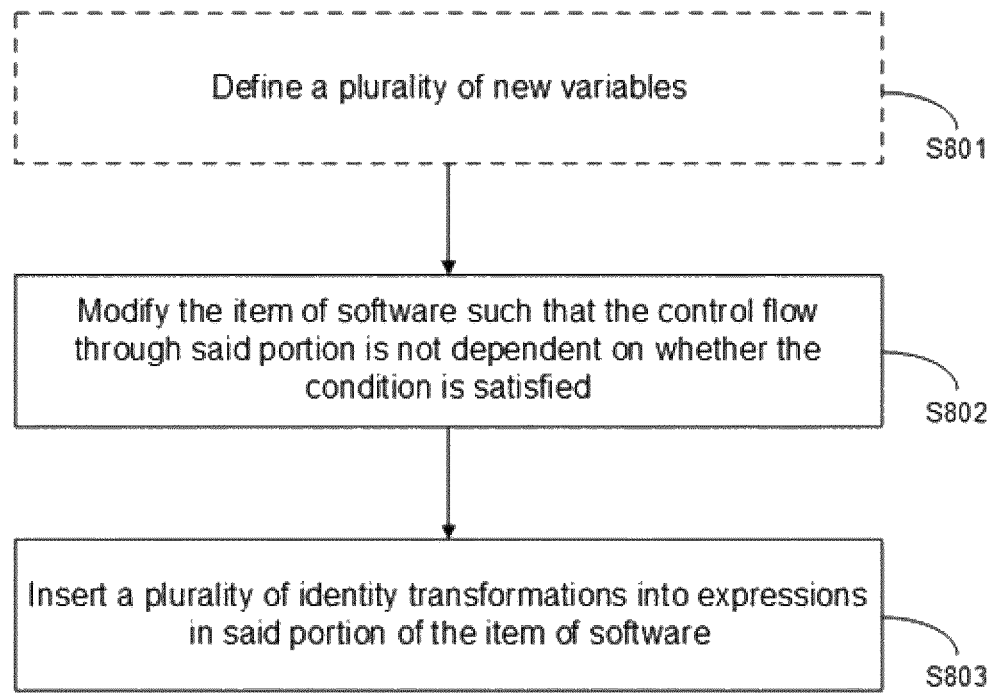
FIGURE 8
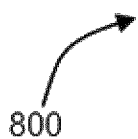
800
FIGURE 10
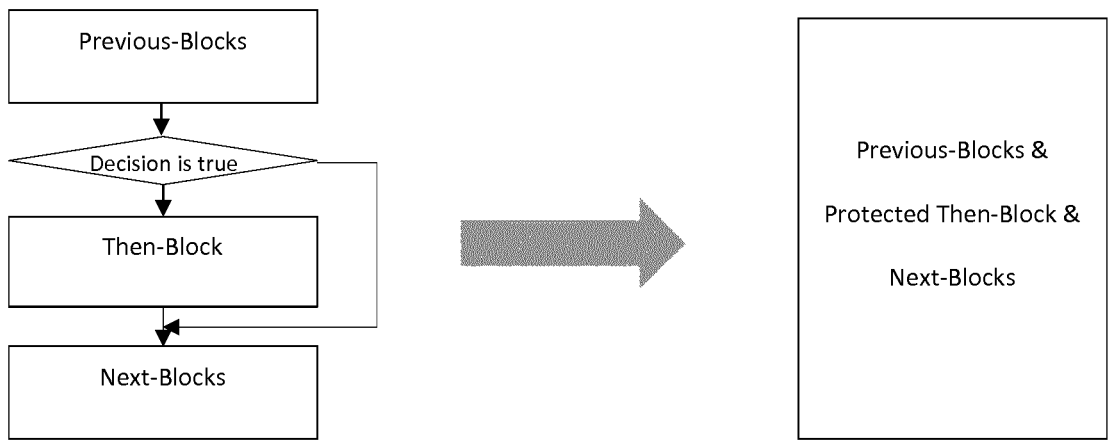

PROTECTING AN ITEM OF SOFTWARE

The present application is the United States national stage of International Application No. PCT/EP2015/056890, filed Mar. 30, 2015 and claims priority to Great Britain Patent Application No. 1405754.1, filed Mar. 31, 2014, the entire contents of which are incorporated herein by reference.

FIELD OF THE INVENTION

The present invention relates to methods for protecting an item of software, and apparatus and computer programs for carrying out such methods. In particular, the present invention relates to protecting an item of software so as to obfuscate a condition which causes a variation in control flow through a portion of the item of software dependent on whether the condition is satisfied, wherein satisfaction of the condition is based on evaluation of one or more condition variables.

BACKGROUND OF THE INVENTION

It is well-known that attacks are often launched against items of software. The attacker may wish to obtain secret information contained within the item of software (such as a cryptographic key), with the aim of misusing that secret information (for example by distributing the cryptographic key to other people/systems so that those people/systems can use the cryptographic key in an unauthorised manner). Similarly, the attacker may wish to modify the execution flow of an item of software. For example, the item of software may have a decision point that checks whether a user of the item of software has certain permissions or access rights—if the user has those permissions or access rights then the item of software may grant the user access to certain functionality or data, otherwise such access is denied. The attacker may wish to try to modify the execution of the item of software at this decision point so that, even if the user does not have the permissions or access rights, the item of software still grants the user access to that certain functionality or data.

There are numerous well-known software protection techniques that can be applied to an initial item of software in order to generate a protected item of software with the aim of making it impossible (or at least sufficiently difficult) for an attacker to be successful in his attacks.

The present invention seeks to provide an alternative method for protecting an item of software which provides various advantages over those of the prior art.

SUMMARY OF THE INVENTION

According to a first aspect of the present invention, there is provided a method of protecting an item of software so as to obfuscate a condition which causes a variation in control flow through a portion of the item of software dependent on whether the condition is satisfied, wherein satisfaction of the condition is based on evaluation of one or more condition variables. The method comprises: (i) modifying the item of software such that the control flow through said portion is not dependent on whether the condition is satisfied; and (ii) inserting a plurality of identity transformations into expressions in said portion of the modified item of software, wherein the identity transformations are defined and inserted such that, in the absence of tampering, they maintain the results of the expressions if the condition is satisfied and such that they alter the results of the expressions if the condition is not satisfied, wherein each identity transformation is directly or indirectly dependent on at least one of the one or more condition variables.

Thus, through the use of identity transformations, the control flow through said portion of the item of software is no longer dependent on the condition and the condition variable(s). Instead of the condition being explicit in the item of software, the condition becomes implicit in the identity transformations. Furthermore, an attacker wishing to tamper with the code to force it down a particular control flow path (e.g. a password is correct control flow path) is required to tamper with each of the identity transformations in order to successfully attack the code, whereas a single attack on the condition would have been sufficient in the original item of software.

Advantageously, the method further comprises defining a plurality of new variables. This adds complexity to the code to make it harder for an attacker to identify the relevant variables to tamper with in an attack.

Optionally, a value assigned to at least one of the new variables is not based, directly or indirectly, on any of the one or more condition variables. Optionally, a value assigned to at least one of the new variables is a constant value. Optionally, a value assigned to at least one of the new variables is based on a program variable of the item of software, said program variable being different than the one or more condition variables.

Advantageously, a value assigned to at least one of the new variables is based, directly or indirectly, on at least one of the one or more condition variables. This spreads the condition variable(s) amongst more variables, again requiring an attacker to tamper with additional portions of the item of software in order to carry out a successful attack. More advantageously, each of the one or more condition variables is used, directly or indirectly, to assign a value to at least one of the new variables. In some embodiments, at least one identity transformation is dependent on at least one of the new variables. Optionally, the method further comprises (iii) reformulating the condition to produce a new condition, the new condition being based on at least one of the new variables, wherein the new condition is satisfied if the condition is satisfied, and wherein the new condition is not satisfied if the condition is not satisfied; and (iv) modifying the item of software such that at least part of the control flow is dependent on whether the new condition is satisfied. Optionally, the method further comprises modifying said portion of the item of software such that at least one instance of at least one of the one or more condition variables is replaced by an equivalent expression based on at least one of the new variables.

Optionally, the method further comprises: (v) identifying a code block in the item of software where at least one of the one or more condition variables is assigned a value that is subsequently used to test whether the condition is satisfied; and (vi) assigning values to at least some of the new variables in said code block. Optionally, assigning values to at least some of the new variables in said code block comprises inserting assignment statements spread throughout said code block.

In one embodiment, the item of software comprises an IF-THEN statement including an IF section of code comprising the condition and a THEN section of code arranged to be executed in response to the condition being satisfied, and wherein modifying the item of software comprises removing the IF-THEN statement such that the modified item of software always executes the THEN section of code regardless of whether the condition is satisfied.

In another embodiment, the item of software comprises an IF-THEN-ELSE statement including an IF section of code comprising the condition, a THEN section of code arranged to be executed in response to the condition being satisfied and an ELSE section of code arranged to be executed in response to the condition not being satisfied, and wherein modifying the item of software comprises removing the IF-THEN-ELSE statement such that the modified item of software always executes the THEN section of code regardless of whether the condition is satisfied.

In yet another embodiment, the item of software comprises an IF-THEN-ELSE statement including an IF section of code comprising the logical complement of the condition, a THEN section of code arranged to be executed in response to the condition not being satisfied and an ELSE section of code arranged to be executed in response to the condition being satisfied, and wherein modifying the item of software comprises removing the IF-THEN-ELSE statement such that the modified item of software always executes the ELSE section of code regardless of whether the condition is satisfied.

Advantageously, at least one of the identity transformations is a multiplication identity transformation which, in the absence of tampering, evaluates to 1 if the condition is satisfied and does not evaluate to 1 if the condition is not satisfied, wherein said multiplication identity transformation may be inserted into an expression by multiplying a variable in the expression by the multiplication identity transformation. Advantageously, at least one of the identity transformations is an addition identity transformation which, in the absence of tampering, evaluates to 0 if the condition is satisfied and does not evaluate to 0 if the condition is not satisfied, wherein said addition identity transformation may be inserted into an expression by adding the addition identity transformation to a variable in the expression. Optionally, the identity transformations are defined using an identity transformation database comprising generic identity transformation formulae.

Optionally, the method further comprises: (vii) identifying all control flow paths through said portion of the modified item of software; and (viii) for each identified control flow path, taking into account values of variables along that control flow path so as to identify respective identity transformations for insertion into expressions in that control flow path.

Optionally, the method further comprises identifying a condition in the item of software to be obfuscated.

Optionally, the method further comprises inserting a branch point in the control flow in said portion of the modified item of software, the control flow path taken from said branch point being independent of whether the condition is satisfied. Such action may further confuse an attacker.

Optionally, subsequent to said portion of the modified item of software, the control flow through the modified item of software may vary dependent on whether the condition is satisfied.

According to a second aspect of the invention, there is provided a method of protecting an item of software, the method comprising the steps of: (a) using the method of the first aspect to protect the item of software so as to obfuscate a first condition which causes a variation in control flow through a first portion of the item of software dependent on whether the first condition is satisfied; and (b) using the method of the first aspect to protect the item of software so as to obfuscate a second condition which causes a variation in control flow through a second portion of the item of software dependent on whether the second condition is satisfied.

Optionally, there is at least a partial overlap between said first and second portions of the item of software. Optionally, the second condition is the logical complement of the first condition.

According to a third aspect of the present invention, there is provided a method of producing a computer program product comprising protecting an item of software by carrying out the method of the first or second aspects and generating the computer program product based, at least in part, on the modified item of software.

According to a fourth aspect of the present invention, there is provided an apparatus arranged to carry out a method of the first or second aspects.

According to a fifth aspect of the present invention, there is provided a computer program which, when executed by a processor, causes the processor to carry out a method of the first or second aspects.

According to a sixth aspect of the present invention, there is provided a computer-readable medium storing a computer program of the fifth aspect.

According to a seventh aspect of the present invention, there is provided an apparatus for protecting an item of software. The apparatus comprises an input, an output and processing means. The input is for receiving an item of software to be protected, the item of software comprising a condition which causes a variation in control flow through a portion of the item of software dependent on whether the condition is satisfied, wherein satisfaction of the condition is based on evaluation of one or more condition variables. The output is for outputting a protected item of software. The processing means is for producing the protected item of software from the item of software to be protected by: (i) modifying the item of software such that the control flow through said portion is not dependent on whether the condition is satisfied; and (ii) inserting a plurality of identity transformations into expressions in said portion of the modified item of software, wherein the identity transformations are defined and inserted such that, in the absence of tampering, they maintain the results of the expressions if the condition is satisfied and such that they alter the results of the expressions if the condition is not satisfied, wherein each identity transformation is directly or indirectly dependent on at least one of the one or more condition variables.

BRIEF DESCRIPTION OF THE DRAWINGS

Embodiments of the invention will now be described, by way of example only, with reference to the accompanying drawings, in which:

FIG. 4A schematically illustrates an exemplary initial item of software 220 which may be protected using the method 300 of FIG. 3;

FIG. 4B schematically illustrates a protected item of software that the method 300 produces when processing the initial item of software 220 illustrated in FIG. 4A;

FIG. 8 schematically illustrates a method 300 of protecting an item of software according to an embodiment of the invention;

FIG. 10 schematically illustrates the protection of an IF-THEN statement according to an embodiment of the invention.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
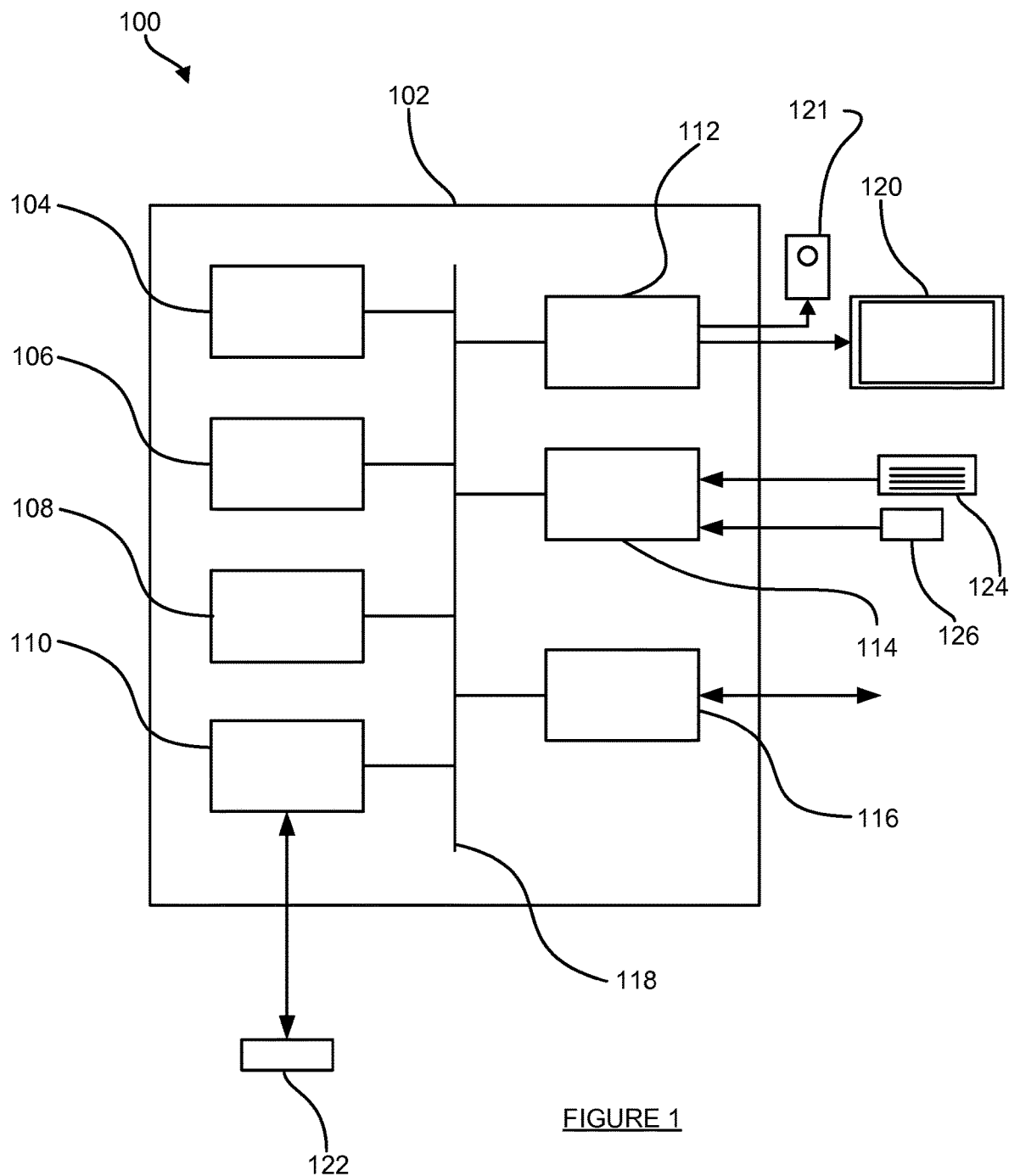
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2:
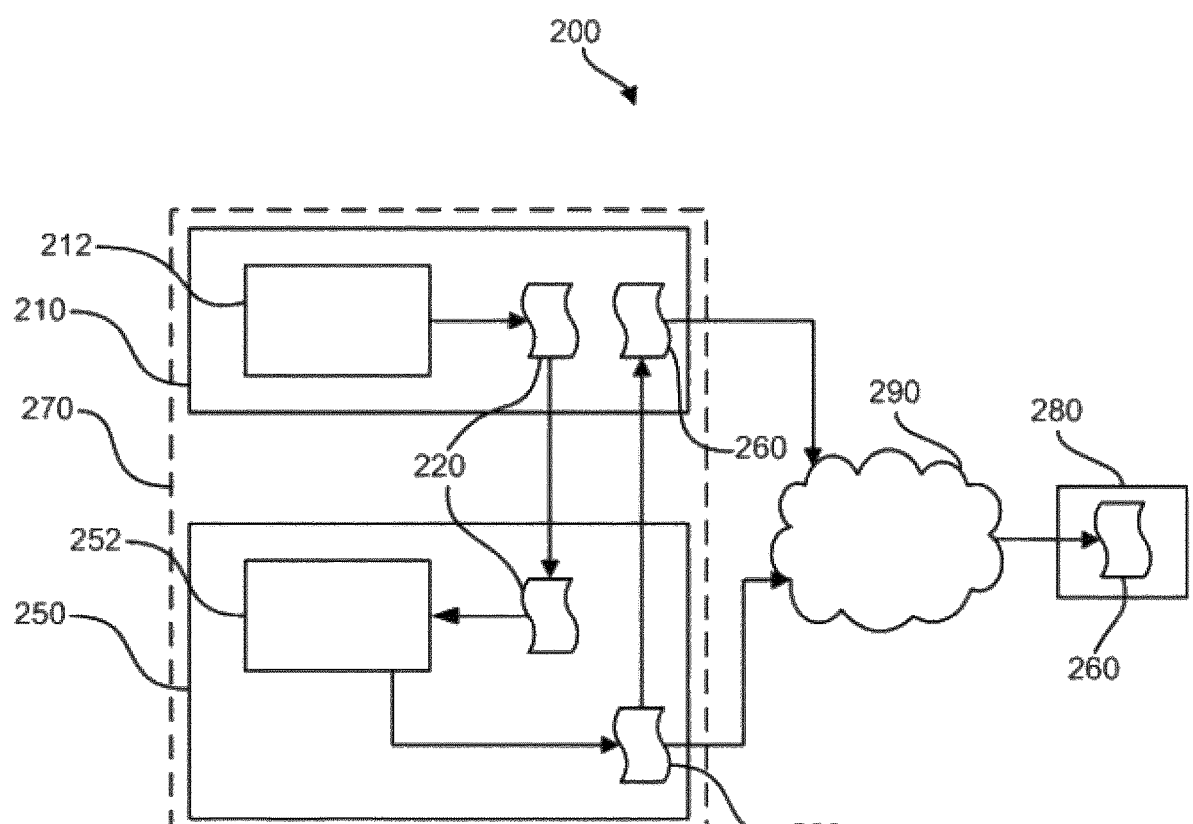
FIG. 2 schematically illustrates a system 200 according to an embodiment of the invention.

FIG. 2 schematically illustrates a system 200 according to an embodiment of the invention. The system 200 comprises: a software generation system 210; a software protection system 250; a user system 280; and a network 290.

The software generation system 210 comprises (or executes or uses) a software generation tool 212 that generates an initial item of software 220. The software generation tool 212 may be, for example, a software application that a processor of the software generation system 210 executes. The software generation system 210 may be arranged to generate the initial item of software 220 autonomously; additionally or alternatively, the software generation system 210 may be arranged to generate the initial item of software 220 under the control of one or more software developers who write, at least in part, software code that forms part of the initial item of software 220. Tools for generating or developing an item of software are very well-known and shall, therefore, not be described in more detail herein.

The initial item of software 220 may comprise one or more of source code, object code, executable code and binary code. The initial item of software 220 may be programmed or written in one or more programming languages, which may comprise compiled programming languages and/or interpreted or scripted programming languages. The initial item of software 220 may comprise one or more modules or software components or computer programs, which may be presented or stored within one or more files. Indeed, the initial item of software 220 may be an entire software application, a software library, or the whole or a part of one or more software functions or procedures, or anywhere in-between (as will be appreciated by the person skilled in the art).

The initial item of software 220, when executed by a processor, is arranged to perform (or to cause the processor to perform) data processing based on one or more items of data. Each item of data could, respectively, be any type of data, such as audio data, video data, multimedia data, text data, financial data, one or more cryptographic keys, digital rights management data, conditional access data, etc. The data processing may comprise one or more of: (a) a decision based, at least in part, on at least one of the one or more items of data; (b) a security-related function; (c) an access-control function; (d) a cryptographic function; and (e) a rights-management function. However, it will be appreciated that the data processing may comprise one or more other types of functions or operations in addition to, or as an alternative to, the above examples. As one example, the data processing may relate to providing a user access to content (such as audio and/or video data) that is received and/or stored as encrypted content, where the user is provided access to the content only if the user has appropriate access permissions/rights. The one or more items of data may, therefore, comprise: the encrypted content; details about, or an identification of, the user and/or the user system 280; data specifying one or more permissions and/or rights; and one or more cryptographic keys (which could be stored as part of the initial item of software 220). Consequently, it is desirable to protect the initial item of software 220, so that an attacker cannot use the initial item of software 220 in an unauthorised manner to thereby gain access to the content even if the attacker is not authorised to access the content, i.e. to prevent the attacker bypassing the conditional access and/or digital rights management functionality provided by the initial item of software 220 (for example, by determining one or more decryption keys, or circumventing a decision point or branch point in the initial item of software 220 that relates to whether or not a user should be provided access to the content). It will be appreciated that there is, of course, other functionality that the initial item of software 220 could perform and/or other information that the initial item of software 220 uses for which it would (for similar or perhaps alternative reasons) be desirable to protect against an attacker. Consequently, as shown in FIG. 2, the initial item of software 220 is provided (or transferred or communicated) to the software protection system 250.

The software protection system 250 comprises (or executes or uses) a software protection tool 252. The software protection tool 252 may be, for example, a software application that a processor of the software protection system 250 executes. The software protection tool 252 is arranged to receive, as an input, the initial item of software 220. The software protection tool 252 generates a protected item of software 260 based on the received initial item of software 220. Methods by which the software protection tool 252 generates the protected item of software 260 shall be described later.

The software generation system 210 and the software protection system 250 may be run or operated by different entities. Thus, as shown in FIG. 2, the software protection system 250 may output the protected item of software 260 to the software generation system 210. With this model, the software protection system 250 provides a protection service to the software generation system 210. Alternatively, the software generation system 210 and the software protection system 250 may be run or operated by the same entity—indeed, the software generation system 210 and the software protection system 250 may form part of a single system (illustrated in FIG. 2 by the dashed line 270) that uses the software generation tool 212 to generate an initial item of software 220 and that uses the software protection tool 252 to protect that initial item of software 220 by generating a protected item of software 260.

Thus, the software generation system 210 and/or the software protection system 250 may output (or provide or communicate) the protected item of software 260 to the user system 280 via the network 290. It will be appreciated, however, that distribution of the protected item of software 260 may be performed by a different entity not shown in FIG. 2.

It will also be appreciated that the protected item of software 260 may undergo various additional processing after the protected item of software 260 has been generated by the software protection system 250 and before distribution to the user system 280. It will, therefore, be appreciated that in the follow description, references to distribution or use of the protected item of software 260 include distribution or use of the piece of software that results from applying the additional processing to the protected item of software 260. For example, the protected item of software 260 may need to be compiled and/or linked with other items of software (for instance if the protected item of software 260 is to form part of a larger software application that is to be distributed to the user system 280). However, it will be appreciated that such additional processing may not be required (for example if the protected item of software 260 is a final piece of JavaScript ready for distribution).

The network 290 may be any kind of data communication network suitable for communicating or transferring the protected item of software 260 to the user system 280. Thus, the network 290 may comprise one or more of: a local area network, a wide area network, a metropolitan area network, the Internet, a wireless communication network, a wired or cable communication network, a satellite communications network, a telephone network, etc. The software generation system 210 and/or the software protection system 250 may be arranged to communicate with the user system 280 via the network 290 via any suitable data communication protocol. Indeed, the protected item of software 260 may be provided to the user system 280 via a physical medium (such as being stored on one or more CDs or DVDs), so that the network

290 may then comprise a delivery system for physically delivering the physical medium to the user system 280.

The user system 280 is arranged to use the protected item of software 260, for example by executing the protected item of software 280 on one or more processors of the user system 280.

The user system 280 may be any system suitable for executing the protected item of software 280. Thus, the user system 280 may be one or more of: a personal computer, a laptop, a notepad, a tablet computer, a mobile telephone, a set top box, a television, a server, a games console, etc. The software protection system 250 and the software generation system 210 may, for example, comprise one or more personal computers and/or server computers. Thus, each of the user system 280, the software protection system 250 and the software generation system 210 may comprise one or more respective systems 100 as described above with reference to FIG. 1.

It will be appreciated that, whilst FIG. 2 illustrates the system 200 as comprising a single user device 280, a single software generation system 210, and a single software protection system 250, the system 200 may comprise multiple user devices 280 and/or multiple software generation systems 210 and/or multiple software protection systems 250.

2—Software Protection Techniques

As mentioned above, the aim of the software protection tool 252 is to protect the functionality or data processing of the initial item of software 220 and/or to protect data used or processed by the initial item of software 220. In particular, the protected item of software 260 will provide the same functionality or data processing as the initial item of software 220—however, this functionality or data processing is implemented in the protected item of software 260 in a manner such that an operator of the user system 280 cannot access or use this functionality or data processing from the protected item of software 260 in an unintended or unauthorised manner (whereas if the user system 280 were provided with the initial item of software 220, then the operator of the user system 280 might have been able to access or use the functionality or data processing in an unintended or unauthorised manner). Similarly, the protected item of software 260 may store secret information (such as a cryptographic key) in a protected or obfuscated manner to thereby make it more difficult (if not impossible) for an attacker to deduce or access that secret information (whereas if the user system 280 were provided with the initial item of software 220, then the operator of the user system 280 might have been able to deduce or access that secret information from the initial item of software 220).

For example, the initial item of software 220 may comprise a decision (or a decision block or a branch point) that is based, at least in part, on at least one of the one or more items of data to be processed by the initial item of software 220. If the initial item of software 220 were provided to the user system 280, then an attacker may be able to force the initial item of software 220 to execute so that a path of execution is followed after processing the decision even though that path of execution was not meant to have been followed. For example, the decision may comprise testing whether a program variable B is TRUE or FALSE, and the initial item of software 220 may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger) force the initial item of software 220 to follow path $P_F$ if the decision identified that B is TRUE and/or force the initial item of software 220 to follow path $P_T$ if the decision identified that B is FALSE. Therefore, in some embodiments, the software protection tool 250 aims to prevent (or at least make it more difficult for) the attacker to do this by applying one or more software protection techniques to the decision within the initial item of software 220 when generating the protected item of software 260.

A "white-box" environment is an execution environment for an item of software in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger—in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. It would be desirable to prevent the attacker from modifying the execution/control flow of the item of software, for example preventing the attacker forcing the item of software to take one execution path after a decision block instead of a legitimate execution path. There are numerous techniques, referred to herein as "white-box obfuscation techniques", for transforming the initial item of software 220 into the protected item of software 260 so that the protected item of software 260 is resistant to white-box attacks, i.e. so that the protected item of software 260, when executing in a white-box environment, is resistant to attacks (such as the ones mentioned above) by an attacker.

White-box obfuscation techniques are examples of software protection techniques. In embodiments of the invention, the software protection tool 252 may apply a software protection technique to the initial item of software 220 to generate the protected item of software 260.

There are numerous ways in which the above-mentioned software protection may be implemented within the protected item of software 260, i.e. there are numerous ways in which the above-mentioned software protection techniques may be applied to the initial item of software to obtain the protected item of software 260. In particular, to generate the protected item of software 260 from the initial item of software 220, the software protection tool 252 may modify one or more portions of code within the initial item of software 220 and/or may add or introduce one or more new portions of code into the initial item of software 220. The actual way in which these modifications are made or the actual way in which the new portions of code are written can, of course, vary—there are, after all, numerous ways of writing software to achieve the same functionality.

3—Diffusing and Diluting Program Decisions

We now describe a method of protecting the initial item of software 220 so as to obfuscate a condition which causes a variation in control flow through a portion of the item of software dependent on whether the condition is satisfied, wherein satisfaction of the condition is based on evaluation of one or more condition variables. The portion of the item of software that is dependent on whether the condition is satisfied is referred to as "the conditional code" in much of the description that follows. In addition, the conditional code is denoted by reference 900A in FIG. 9A.

As shown in FIG. 8, the method 800 comprises two main steps. Step S802 involves modifying the item of software such that the control flow through said portion (i.e. through the conditional code) is not dependent on whether the condition is satisfied. Then, step S803 involves inserting a plurality of identity transformations into expressions in said portion of the modified item of software, wherein the identity transformations are defined and inserted such that, in the absence of tampering, they maintain the results of the expressions if the condition is satisfied and such that they alter the results of the expressions if the condition is not satisfied, wherein each identity transformation is directly or indirectly dependent on at least one of the one or more condition variables.

It is easy to compute identity transformations which leave the results of expressions unaltered (such as adding zero or multiplying by one) in the absence of tampering, but which alter the results in chaotic ways if some of the variables, but not others, have been tampered with.

In a preferred embodiment, there is an additional initial step S801 of defining a plurality of new variables. This is an option step, as indicated by the dashed line in FIG. 8. The definition of new variables adds complexity to the item of software to make it harder for an attacker to identify the relevant variables to tamper with in an attack. Optionally, a value assigned to at least one of the new variables is not based, directly or indirectly, on any of the one or more condition variables. Optionally, a value assigned to at least one of the new variables is a constant value. Optionally, a value assigned to at least one of the new variables is based on a program variable of the item of software, said program variable being different than the one or more condition variables. Advantageously, a value assigned to at least one of the new variables is based, directly or indirectly, on at least one of the one or more condition variables. This enables these new variables to be used in place of the condition variable(s) in the portion of the item of software. More advantageously, each of the one or more condition variables is used, directly or indirectly, to assign a value to at least one of the new variables. In this way, the set of one or more new variables may be used to completely replace the original set of condition variables if desired. In a preferred embodiment, at least one identity transformation is dependent on at least one of the new variables.

In a particularly preferred embodiment including all of steps S801-S803, each of the one or more condition variables is used, directly or indirectly, to assign a value to at least one of the new variables. Furthermore, each identity transformation is dependent on at least one of the new variables.

Thus, it is possible to produce an item of software which is protected against tampering by diffusing and diluting the program decision related to the condition. In particular, spreading decision values (i.e. the values of the condition variables) over more values (i.e. the values of the new variables) diffuses the decision values, making them harder for an attacker to tamper with. The more new variables that are defined, the harder it will become for an attacker to successfully tamper with the code. Equally, the more new variables that are defined, the less efficient the code will become. Thus, it is necessary to strike a balance between protection and efficiency.

The new variables have specific relationships based on how they are derived/defined (e.g. they could come from a common source). For example, new variables x and y might be twice and half of an original condition variable v, say. Then we know that x is four times y. Identity transformations may then be inserted so as to depend on x being four times y (e.g., $x-4y=0$ should be true). Then, if x or y is modified by tampering, the assumed relationship fails to hold, and the code no longer computes a correct identity. Values of expressions are not maintained as a result, and downstream code depending on those expression results then fails. That is, the present method 800 is able to make code aggressively fragile under tampering. Generally, tampering is a goal-oriented activity (e.g., cause execution to proceed whether or not the password is correct). In such a goal-oriented context, making software fail rather than proceed under tampering prevents an attacker from gaining illicit access.

In order to dilute and diffuse a decision, new variables (such as y and z above) are defined such that information is spread out over more storage locations. Thus, the decision-controlling value(s) (i.e. the values of the one or more condition variables) are spread out over more variables and the original decision is harder to successfully tamper with. Using the modified control flow and the identity transformations, the original decision (and thereby the program functionality) is preserved without explicitly reciting the condition (or the complement of the condition) on which the decision is based. Thus, in the absence of tampering, the method does not cause the normal functionality of the item of software to change.

It will be appreciated that the steps may be performed in a different order so long as the final result is the same.

Using an example, we will now consider this methodology in detail.

Exemplary Initial Item of Software (P1)

Appendix 1 shows an exemplary initial item of software 220 programmed in C-like code. As can be seen, the program (P1) includes various decisions expressed using IF-THEN-ELSE statements. Each of these decisions is associated with an explicitly-recited condition: in the decision on P1-Line 07, the explicitly-recited condition is "format==m1"; in the decision on P1-Line 22, the explicitly-recited condition is "check !=1"; in the decision on P1-Line 28, the explicitly-recited condition is "format==m1"; in the decision on P1-Line 29, the explicitly-recited condition is "c1>0"; and in the decision on P1-Line 37, the explicitly-recited condition is "c2>0".

The majority of these decisions do not require protection from attack since they will not be of interest to an attacker. For example, the P1-Line 07 decision relates to a selection between different data formats that may be used, which is not a particularly useful target for an attacker to attempt to manipulate (since the program will already operate to select the correct format for the data there is little to be gained for an attacker in altering this behaviour). However, the P1-Line 22 decision is critical.

The P1-Line 22 decision determines the remainder of the program's operation based on whether a check value is set to a correct value or not, where check is a program variable. In other words, the control flow through the portion of the item of software in P1-Line 22-44 varies dependent on the value of check (is it 1 or not?). Thus, P1-Line 22-44 represents the conditional code in this case. The value of check comes from a different element of the input array (array a) depending on the format. If format=m1, then the value of check comes from a[3] (see P2-Line 11); otherwise, the value of check comes from a[1] (see P2-Line 20-21). In either case, the P1-Line 22 decision depends on whether or not the check value is equal to 1. If the check value is equal to 1, then the program calculates a correct result based on the data format (see P1-Line 27-42). However, if the check value is not equal to 1, then the program calculates an intentionally incorrect result, i.e. garbage (see P1-Line 23-25). Notably, in this case, the value of the conditional variable (check) is static; in some cases, such values can be dynamically computed and varied during execution of the program. The P1-Line 22 decision is easy to identify and alter, so it would be desirable to protect this decision against such attacks. Relatedly, the portion of code that it is desirable to protect against attackers in this case is the portion of code which calculates the correct result when the check value is equal to 1. In other words, the important portion of code to be protected is the ELSE section of code which defines the steps taken when the value of check is equal to 1 (see P1 Line 27-41). It is less important what happens when the check value is not equal to 1 (see the THEN section of code in P1 Line 23-25) so long as a different result is produced from the correct "check=1" result. Hence, in this case, check is the condition variable that is evaluated to determine whether the condition is satisfied. Furthermore, "check=1" is the critical condition to be protected in this case. Notably, P1-Line 22 does not explicitly recite this condition, but instead explicitly recites the logical complement of this condition (i.e. check !=1). This is because it is the ELSE section of code that is most important in this case. Of course, it would be possible rewrite P1 to explicitly recite the "check=1" condition on P1-Line 22 by swapping the THEN and ELSE sections of code (P1 Line 23-25 and P1 Line 27-41). Either way, the "check=1" condition can be seen to cause a variation in control flow through the item of software (from P1-Line 22 onwards) dependent on whether the condition is satisfied. Thus, the portion of the item of software which has a variable control flow path dependent on the condition (i.e. the conditional code) is the portion set out in P1-Line 22-44. The P1-Line 22 decision is relatively easy for an attacker to identify and is a likely target for an attacker to attempt to manipulate, since its successful manipulation can result in a desired output from the program for the attacker, where the program would not otherwise provide a desired output (i.e. it would normally output an intentionally incorrect value). Therefore, it is desirable to use the method 800 to protect this decision by obfuscating the associated condition (the "check=1" condition).

Exemplary Protected Item of Software (P2)

Appendix 2 shows an exemplary protected item of software 260 that may be produced using the method 800. The differences between the code in Appendix 1 and the code in Appendix 2 are shown in bold and underlined in Appendix 2. These differences will be described below.

New Variables

Firstly, prior to the conditional code, new variables (d1, d2, d3, d4, and d5) are defined on P2-Line 4 and P2-Line 6 in the program (P2) of Appendix 2. Values are then assigned to these new variables. Values are initially assigned to the new variables on P2-Line 6 (d1=0; d2=0; d3=0; d4=m1; d5=0). Some of the new variable values are subsequently reassigned dependent on the data format (see P2-Line 12-17, and P2-Line 20-26). If the value of the variable format is equal to m1, then:
  d1=check
  d2 is not reassigned, so d2=0
  d3=d1+m0=check+m0=check (since m0=0)
  d4=d4+m1=m1+m1=2*m1=2 (since m1=1)
  d5=d4+m1=2+m1=3 (since m1=1)
Otherwise:
  d1 is not reassigned, so d1=0
  d2=a[1] and check=d2, so d2=check
  d3=check+m0=check (since m0=0)
  d4=2*d4+m0=2*m1+m0=2 (since m0=0 and m1=1)
  d5=d4+d3=2+check As can be seen, some of the values of the new variables are based, directly or indirectly, on the condition variable check. For example, if format=m1 then d1 is directly assigned the value of the condition variable check (see P2-Line 12), and d3 is then assigned to be equal to d1+m0 (see P2-Line 15), so d3 is indirectly based on check since d3=d1+m0=check+m0. Similarly, if format≠m1 then the value of d3 is directly related to the condition variable by d3=check+m0 (see P2-Line 22), and the value of d5 is indirectly related to the condition variable by d5=d4+d3=d4+check+m0 (see P2-Line 26). In general, the condition variable is used, directly or indirectly, to assign a value to at least one of the new variables. In this example, the condition variable check is used, directly or indirectly, to assign a value to two of the new variables.

It can also be seen that some of the values of the new variables are not based, directly or indirectly, on the condition variable check. In particular, if format=m1, then the values of d2, d4 and d5 are not based on the value of the condition variable check; and if format≠m1, then the values of d1, d4 and d5 are not based on the value of the condition variable check. In some cases, the values assigned to some of the new variables may be constant values. For example, if format=m1 then the value of d2 is not reassigned so d2=0; and if format≠m1 then the value of d1 is not reassigned so d1=0.

A value of at least one of the new variables may be based on a value of a program variable other than the condition variable. For example, if format=m1 then the value of d3 is based partially on the value of program variable m0, and the values of d4 and d5 are based on the value of program variable m1. Similarly, if format≠m1 then the value of d3 is based partially on the value of program variable m0, and the values of d4 and d5 are based on the values of program variables m0 and m1.

As noted above, the control flow through the conditional code in P1-Line 22-44 varies dependent on whether the condition "check=1" is satisfied. Advantageously, it is desirable to identify an earlier code block where the condition variable (check) is assigned a value that is subsequently used (in P1-Line 22) to test whether the condition is satisfied. This earlier code block where check is assigned a value can then also be used then to assign values to at least some of the new variables. In the example of Appendix 1, the value of check is assigned in either P1-Line 7-14 (if format=1) or in P1-Line 15-21 (if format≠1). Thus, in the protected item of software shown in Appendix 2, some of the new variables are assigned values in the corresponding portions of code (see P2-Line 8-18 and P2-Line 19-29). More advantageously, assignment statements are inserted spread throughout the relevant code block(s) (again, see P2-Line 8-18 and P2-Line 19-29).

Control Flow Modification: Part 1

Another difference between the protected item of software (P2) and the initial item of software (P1) is that the code has been modified so that the control flow is no longer dependent on whether the "check=1" condition is satisfied. In P2, this has been accomplished by removal of the IF-THEN-ELSE statement that previously explicitly recited the critical decision (and the logical complement of the critical condition) in P1 (see P1-Line 22 and P1-Line 26). In particular, the initial item of software included an IF-THEN-ELSE statement (i.e. the conditional code) including an IF section of code comprising the logical complement of the condition, a THEN section of code arranged to be executed in response to the condition not being satisfied (i.e. check !=1) and an ELSE section of code arranged to be executed in response to the condition being satisfied (i.e. check=1). The IF-THEN-ELSE statement has been removed in the protected item of software such that P2 instead always executes the ELSE section of code regardless of whether the condition is satisfied. In other words, P2 includes a modified section of code (see P2-Line 30-45) which corresponds to the ELSE section of code from P1 (see P1-Line 27-42) and which is executed regardless of whether the value of check is equal to 1 or not.

Identity Transformations

In order that the protected item of software (P2) functions in the same manner as the initial item of software (P1), further modifications have also been made to the modified section of code (see P2-Line 30-45) which corresponds to the ELSE section of code from P1. In particular, a plurality of identity transformations has been inserted into expressions in that section of code. The identity transformations are defined and inserted such that they maintain the results of the expressions if the "check=1" condition is satisfied and such that they alter the results of the expressions if the condition "check=1" is not satisfied. The identify transformations define simple expressions based on new variables and/or the condition variable (check) and/or other program variables and/or constant values. Each identity transformation is directly or indirectly based on the condition variable (check). An identity transformation may be indirectly based on the condition variable (check) by being dependent on at least one of the new variables which itself depends on the condition variable. The identity transformations are effectively used to glue new variables and new code together with the original code to form a more complicated control flow and to make it hard for an attacker to identify what is new and what is original.

In more detail, consider the modified section of code in P2-Line 30-37. This section of code relates to part of the previous ELSE section of code in which format=1. Thus, this modified section of code is based on P1-Line 28-35. The identity transformations in this section are as follows:

P2-Line 32 and P2-Line 35:

$$IT1 = d4 - (d1 + d2 + d3) + m1$$
$$= 2^*m1 - (check + 0 + (check + m0)) + m1$$
$$= 2 - (check + 0 + (check + 0)) + 1$$
$$= 3 - 2^*check$$

P2-Line 32:

$$IT2 = d5 - (d1 + d2 + d3)$$
$$= 3^*m1 - (check + 0 + (check + m0))$$
$$= 3 - (check + 0 + (check + 0))$$
$$= 3 - 2^*check$$

P2-Line 35:

$$IT3 = d5 - (2^*d1 + d2)$$
$$= 3^*m1 - (2^*check + 0)$$
$$= 3 - 2^*check$$

If the critical condition is satisfied (i.e. if check=1), then each of these identity transformations clearly evaluates to 1. Therefore, the value of the result variable in this section of code is as follows:
P2-Line 32: result=k1*IT1+c1*IT2
 ⇒ result=k1+c1 if check=1.
P2-Line 35: result=k1*IT3−c1*IT1
 ⇒ result=k1−c1 if check=1.
Thus, by using these identity transformations, it is possible to get the same value for result in this modified section of code as was obtained in the corresponding section of the initial item of software (P1) so long as the condition is satisfied (check=1). In particular, in the initial item of software, P1-Line 30 gives result=k1+c1 (cf. P2-Line 32), and P1-Line 33 gives result=k1−c1 (cf. P2-Line 35).

Similarly, consider the modified section of code in P2-Line 38-45. This section of code relates to part of the previous ELSE section of code in which format≠1. Thus, this modified section of code is based on P1-Line 36-43. The identity transformations in this section are as follows:

P2-Line 40:

$$IT4 = d5 - (d4 + d2) + d3$$
$$= (2 + check) - ((2^*m1 + m0) + check) + (check + m0)$$
$$= (2 + check) - ((2 + 0) + check) + (check + 0)$$
$$= check$$

P2-Line 40:

$$IT5 = d4 - d1 - d2$$
$$= (2^*m1 + m0) - 0 - check$$
$$= 2 - 0 - check$$
$$= 2 - check$$

P2-Line 40:

$$IT6 = d5 - d4$$
$$= (2 + check) - (2^*m1 + m0)$$
$$= (2 + check) - (2 + 0)$$
$$= check$$

P2-Line 40:

$$IT7 = d4 - d3 + d1$$
$$= (2^*m1 + m0) - (check + m0) + 0$$
$$= (2 + 0) - (check + 0) + 0$$
$$= 2 - check$$

If the critical condition is satisfied (i.e. if check=1), then each of these identity transformations clearly evaluates to 1. Therefore, the value of the result variable in this section of code is as follows:
P2-Line 40: result=k2*IT4+c2*IT5
 ⇒ result=k2+c2 if check=1.
P2-Line 43: result=k2*IT6−c2*IT7
 ⇒ result=k2−c2 if check=1.
Thus, by using these identity transformations, it is possible to get the same value for result in this modified section of code as was obtained in the corresponding section of the initial item of software (P1) so long as the condition is satisfied (check=1). In particular, in the initial item of software, P1-Line 38 gives result=k2+c2 (cf. P2-Line 40), and P1-Line 41 gives result=k2−c2 (cf. P2-Line 43).

If the condition is not satisfied (i.e. check≠1), then the identity transformations (IT1-IT7) clearly do not evaluate to 1 because all of these identity transformations use decision variable check and its value as one of parameters directly or indirectly. Only if check=1, can these computations produce the correct results. For check≠1, the value of result will be different (i.e. garbage). Notably, the garbage value obtained from the modified code (P2) may be different from the garbage value obtained from the initial code (P1), but this is fine in this case since the program only requires that a different value is generated when the condition is not satisfied as compared to the value generated when the condition is satisfied. Thus, the operation of the protected item of software 260 is semantically similar to the operation of the initial item of software 220, even though the implementation is different.

Each of the identity transformations IT1-IT7 described above may be termed a multiplication identity transformation since, in the absence of tampering, they each evaluate to 1 if the condition is satisfied and does not evaluate to 1 if the condition is not satisfied. A multiplication identity transformation may be inserted into an expression by multiplying an expression variable by the multiplication identity transformation (as in P2-Line 32, P2-Line 35, P2-Line 40, and P2-Line 43). For example, in P2-Line 32, IT1 is inserted into the expression "k1+c1" by multiplying variable k1 by IT1.

Another type of identity transformation is an addition identity transformation which, in the absence of tampering, evaluates to 0 if the condition is satisfied and does not evaluate to 0 if the condition is not satisfied. Such an addition identity transformation may be inserted into an expression by adding the addition identity transformation to an expression variable. For example, an expression "k1+c1" could be modified by adding an addition identity transformation IT8 to k1 as follows: "(k1+IT8)+c1". Alternatively, an expression "k1*c1" could be modified by adding an addition identity transformation IT8 to k1 as follows: "(k1+IT8)*c1". Notably, multiplication identity transformations and addition identity transformations may both be inserted into the same expression. For example, the expression "k1+c1" may be modified by multiplying variable k1 by multiplication identity transformation IT1 and by adding addition identity transformation IT8 to variable c1: "(k1*IT1)+(c1+IT8)".

Importantly, the protected item of software 260 does not explicitly recite either the originally-recited condition "check !=1" or the logical complement of the originally-recited condition "check==1". Instead, the check decision is now implicit in the modified code which assigns a value to the program variable result. In other words, the check decision becomes implicit in the modified code by virtue of the using the identity transformations. Thus, both the originally-recited condition "check !=1" and the logical complement of the originally-recited condition have been obfuscated in the protected item of software, whilst retaining the same program functionality. This means it is harder for an attacker to identify that a decision is being made, as well as the condition upon which that decision is based. Furthermore, a lot more analysis of the program code is required in order for an attacker to manipulate the operation of the program to achieve a desired outcome.

In general, many mathematics techniques can be used to create different identity transformations. In theory, the number of identity transformations can be infinite. In practice, it is possible to develop a generator to automate a process to generate an identity transformation database comprising generic identity transformation formulae. The identity transformation database includes pre-defined identity transformations which can be parameterized. Algebraic simplifiers provide a ready source of such identities, and more can be found which are especially relevant to computer computations in the book "*Hacker's Delight*" by Henry S. Warren (ISBN 978-0-201-91465-8). In the identity transformation database, each identity transformation formula is classified as a multiplication or addition type of identity transformation. Furthermore, each identity transformation formula may be associated with a fixed number of new variables, each of which may be clarified with some specific property in order to guarantee the identity transformation semantics at runtime.

The method 800 may comprise identifying all control flow paths through the modified portion of the item of software and, for each identified control flow path, identifying respective identity transformations for insertion into expressions in that control flow path, taking into account values of variables along that control flow path. The variables might be new variables and/or existing program variables in this context.

Control Flow Modification: Part 2

Figure 9A:
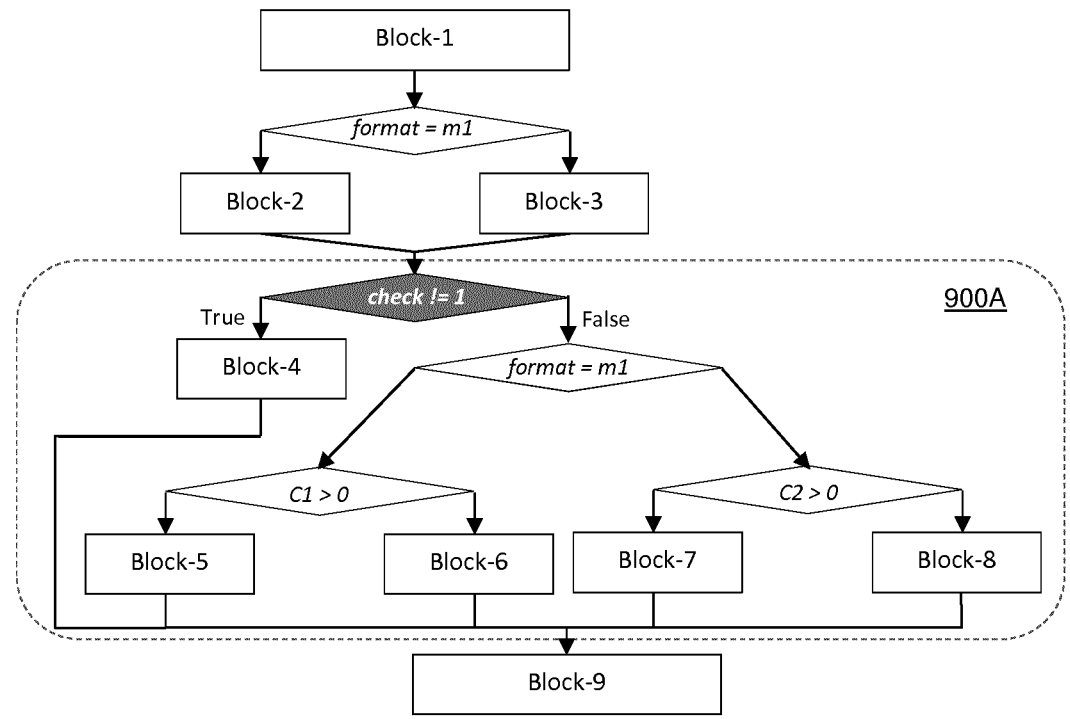
FIG. 9A schematically illustrates the control flow through an exemplary item of software as set out in Appendix 1.
Figure 9B:
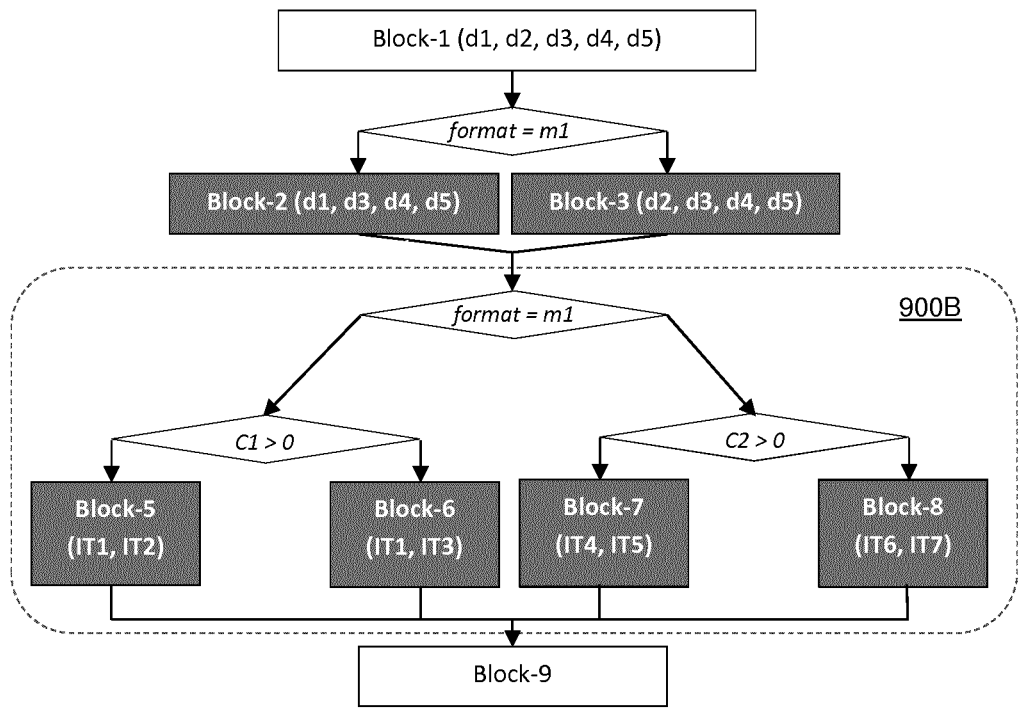
FIG. 9B schematically illustrates the modified control flow through a protected version of the Appendix 1 item of software, the protected version of the item of software being set out in Appendix 2.

The control flow modification between the initial and protected items of software is illustrated in FIGS. 9A and 9B. FIG. 9A schematically illustrates the control flow through the initial item of software shown in Appendix 1, and FIG. 9B schematically illustrates the control flow through the protected item of software shown in Appendix 2.

As shown in FIG. 9A, the initial item of software includes a single decision point (check !=1) which an attacker could attack in order to modify the control flow to meet their needs. Thus, there is only a single attack point in the initial item of software. The conditional code (which is dependent on the decision) is code segment 900A depicted by the in FIG. 9A.

In contrast, as shown in FIG. 9B, the decision previously recited in P1-Line 22 has been diffused and diluted such that there are many attack points spread everywhere within protected example program. The entire conditional code 900A at P1-Line 22-44 has been replaced by a new code segment 900B at P2-Line 30-45. This new protected code segment preserves the same semantics without an explicit decision check. If the check condition is held, code segment 900B will produce the same results as conditional code 900A; otherwise, it will produce garbage results (the garbage results can be different in code segments 900A and 900B). In the new code segment 900B, the condition is implicit due to the use of the identity transformations.

Comparing the two programs before and after diffusing and diluting protection (as illustrated in FIGS. 9A and 9B), it is clearly very easy to alter the check !=1 decision within the initial item of software because only a single place needs to be hacked for a successful attack (as illustrated by the grey shading of the check !=1 decision in FIG. 9A). In other words, a hacker need only modify the check !=1 decision in FIG. 9A in order to guarantee forcing the subsequent execution of the program down the "false" execution path on the right hand side of the Figure. However, it is significantly more difficult and challenging to attack the protected item of software code successfully because many places need to be hacked together (as illustrated by the grey shading of various modified blocks of code in FIG. 9B). If an attacker only breaks some of these places, then the attacker cannot guarantee getting a desired outcome (i.e. non-garbage), so the attack will not be successful.

Diffusing and Diluting Decisions

There exist different control flow protection techniques to protect different natures of program decisions in both academic and commercial worlds. Almost all known protection techniques are based on a direct approach that applies protection to a specific program decision location without diffusing and diluting the decision. Thus, in the prior art, it is still possible to identify the decision itself, as well as the surrounding and following code that depends on the decision (i.e. the conditional code), by running different decision values through the protected program. This means that existing protection is not persistent and is vulnerable to more advanced attacks to break the decision and the following logic associated with the decision. In addition, protected decision code has previously been generated anew for each new use, with the use of mathematical experts to provide the requisite obfuscation and entangling.

In contrast, the method 800 may be considered as a computer-implemented method for automated generation of obfuscated and entangled decision code. The method may be used in conditional access or other situations where obfuscated data contains credential information which, together with information provided by an accessing agent such as a user or a peripheral device, determines whether access should be granted or denied. Thus, the method 800 is particular well-suited to obfuscating binary decisions. Plainly, the automated approach described herein is able to provide decision security at a significantly reduced cost as compared to the historical approach which requires high-priced staff-hours every time.

Importantly, according to the present methodology, the critical decision is diffused and diluted in the protected item of software such that the execution path through the protected item of software does not depend on whether or not the critical condition is satisfied. The general rule of this protection is that a given decision among alternatives should produce very similar control flow behaviour irrespective of the decision taken. For example, a block of code which either does or does not accept a given authentication token should behave similarly whether the token is accepted or rejected during its execution. In particular, control-flow should not differ in distinguishable ways for some time subsequent to the point at which the decision is taken. Eventually, of course, differences in behaviour may arise. However, this could happen at a point substantially later than that at which the decision is taken so as to make reverse-engineering of the decision process as arduous as possible for an attacker.

Moreover, a given decision can be hidden by diffusing and diluting it with many other decisions (i.e., by mixing code belonging to multiple distinct decisions) and blending the decision code with other surrounding behaviours and the rest of program code. Therefore, a single decision attack point is replaced by multiple attack points that also make modifying the decision in any purposeful way difficult indeed.

In fact, this invention provides not only a new approach to decision code protection but also a new blending method to remove detectable boundaries between new program dependencies introduced by the instant invention and the original program dependencies, in terms of both data flow and control flow across the program as a whole.

The introduction of new variables adds complexity to the code. The use of identity transformations based on new variables enables the impact of the condition variable (check) to be hidden within the code. The modified code preserves the same semantics without an explicit condition check.

Conditional Code for Protection

From a security perspective, not every program decision is security critical. Some are normally business logics that are not security targets. However, it is desirable to protect certain program decisions that are critical for a business model and that might be vulnerable against a security breach (e.g. the P1-Line 22 decision). Any alternative to such decisions can cause negative business impacts. In general, such a decision is represented by a conditional branch in program languages. Let us consider two kinds of conditional branches an IF-THEN branch, and an IF-THEN-ELSE branch) in more detail.

FIG. 10 schematically illustrates obfuscation of an IF-THEN branch using the method 800 of the present invention. In this example, the item of software comprises an IF-THEN statement including an IF section of code comprising the condition and a THEN section of code arranged to be executed in response to the condition being satisfied. In this case, modifying the item of software according to the method 800 comprises removing the IF-THEN statement such that the modified item of software always executes the THEN section of code regardless of whether the condition is satisfied. In other words, after applying diffusing and diluting decision protection to an IF-THEN branch, the decision part of this branch disappears completely and its semantics is hidden such that multiple execution paths are replaced by a single execution path. The conditional branch is instead replaced by a protected THEN part of the IF-THEN code that is blended with previous and following code blocks ("Previous-blocks" and "Next-blocks") so that decision semantics can be very difficult to extract from the new code after applying such protection (see the right hand side of FIG. 10). At run-time, there is no explicit decision check on the protected decision in the modified/protected code on the right hand side in FIG. 10. No matter whether the decision is held (true) or failed (false), the control flow remains the same. In effect, the computation results of this new code imply such a decision so that correct results can be guaranteed only if the decision is held. It is relatively simple to use typical compilation techniques to maintain the original semantics of data flow through the previous code blocks, the protected THEN block, and the following code blocks ("Next-blocks"). We treat these aspects and details as pre-art and beyond this invention. See also the description in Appendix 3 related to FIGS. 4A and 4B.

Figure 11:
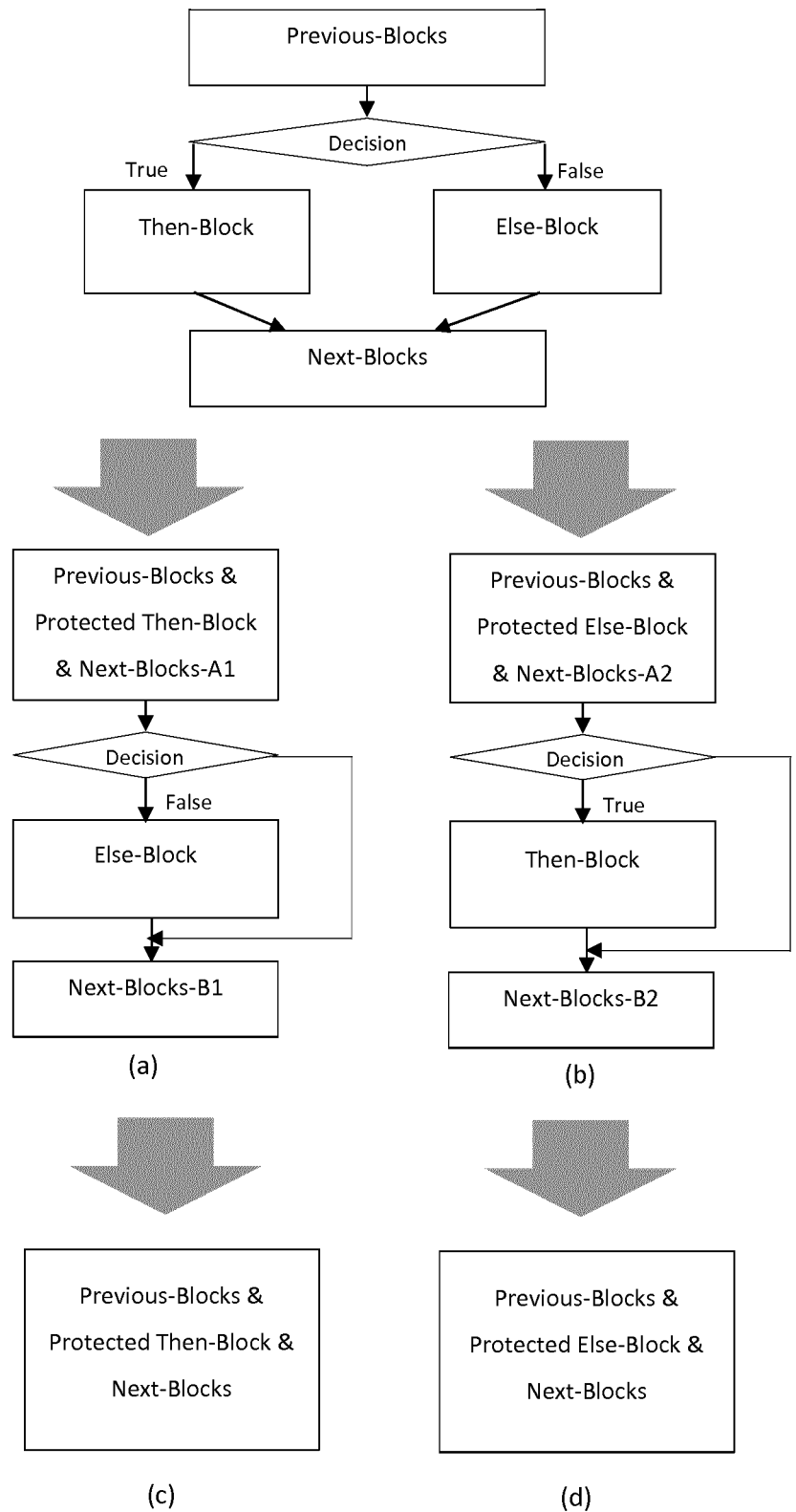
FIG. 11 schematically illustrates the protection of an IF-THEN-ELSE statement according to an embodiment of the invention.

FIG. 11 schematically illustrates obfuscation of an IF-THEN-ELSE branch using the method 800 of the present invention. In this example, the item of software comprises an IF-THEN-ELSE statement including an IF section of code comprising the decision, a THEN section of code arranged to be executed in response to the decision being true and an ELSE section of code arranged to be executed in response to the decision being false. As shown in FIG. 11, having decided which portion of the decision is more critical from a security standpoint, there are two basic ways of protecting such an IF-THEN-ELSE branch using the method 800: (a) protection of the THEN section of code only; or (b) protection of the ELSE section of code only. Thus, a first part of the decision and its semantics are completely hidden (i.e. obfuscated), and the other part of the decision (which remains explicit) can be moved away from the protected first part within the item of software. As shown in FIG. 11, the item of software may comprise blocks of code prior to and after the IF-THEN-ELSE statement ("Previous-blocks" and "Next-blocks"). It is possible perform a program analysis of the protected THEN or ELSE section of code with the Next-Blocks so as to split the Next-blocks into two segments: Next-blocks-A and Next-blocks-B. Next-blocks-A are independent of the IF-THEN-ELSE statement and may be moved to an earlier location in the item of software (i.e. before the unprotected (i.e. explicit) ELSE or THEN section of code) and may further be blended with the protected part. Next-blocks-B are in some way dependent on the IF-THEN-ELSE statement (e.g. dependent on variables assigned during the IF-THEN-ELSE statement) and may be moved just after the unprotected (i.e. explicit) ELSE or THEN section of code.

Consider FIG. 11(*a*) where only the THEN section of code is protected. In this case, the item of software comprises an IF-THEN-ELSE statement including an IF section of code comprising the condition, a THEN section of code arranged to be executed in response to the condition being satisfied and an ELSE section of code arranged to be executed in response to the condition not being satisfied, wherein modifying the item of software comprises removing the IF-THEN-ELSE statement such that the modified item of software always executes the THEN section of code regardless of whether the condition is satisfied. Thus, the "True" and THEN sections of code are completely hidden (i.e. obfuscated), and replaced by a protected THEN part that is blended with code in both Previous-Blocks and Next-Blocks-A1. The "False" and ELSE sections of code are reformulated as an explicit IF-THEN branch and moved to between the Next-Blocks-A1 and the Next-Blocks-B1. See also the description in Appendix 3 related to FIGS. 5A and 5B.

Consider FIG. 11(b) where only the THEN section of code is protected. In this case, the item of software comprises an IF-THEN-ELSE statement including an IF section of code comprising the logical complement of the condition, a THEN section of code arranged to be executed in response to the condition not being satisfied and an ELSE section of code arranged to be executed in response to the condition being satisfied, wherein modifying the item of software comprises removing the IF-THEN-ELSE statement such that the modified item of software always executes the ELSE section of code regardless of whether the condition is satisfied. Thus, the "False" and ELSE sections of code are completely hidden (i.e. obfuscated), and replaced by a protected ELSE part that is blended with code in both Previous-Blocks and Next-Blocks-A2. The "True" and THEN sections of code are reformulated as an explicit IF-THEN branch and moved to between the Next-Blocks-A2 and the Next-Blocks-B2.

It is possible to further modify the code in some cases. For example, if the unprotected (explicit) ELSE or THEN section of code is not significant (e.g. it generates garbage as in Appendix 1), then it may be possible to delete this portion of code entirely from the protected item of software (as in Appendix 2 where there is no explicit "check !=1" decision, even though it is the opposite condition (i.e. check==1) which has been protected). This possibility is illustrated in parts (c) and (d) of FIG. 11.

Alternatively, if both parts of the decision are significant and both require protection, then it is possible to apply this protection again recursively, or to use other protection techniques, to protect the second section of code. For example, consider an IF-THEN-ELSE statement where it is desirable to protect both the THEN section of code (and the associated condition) as well as the ELSE section of code (and the associated complementary condition). In this case, it will be understood that the method 800 could be used to first apply protection to (i.e. obfuscate) the THEN section of code and the associated condition. This would include defining new variables, modifying the control flow such that the THEN section of code is always executed regardless of whether the condition is satisfied, and inserting identity transformations as appropriate. The same method 800 could then be used again to apply protection to (i.e. obfuscate) the ELSE section of code. This could involve defining further new variables. Alternatively, some or all of the new variables defined in the first iteration could be used in the second iteration. Different identity transformations are likely to be needed in the second iteration due to the dependence of the identity transformations on the condition variable(s). In any case, after both iterations, the protected code would not explicitly recite either the condition or the complement of the condition, and the protected code would be such that both the THEN and ELSE sections of code would always execute regardless of whether the condition was satisfied.

It will be understood that the present method 800 could equally be used to protect a portion of an IF-THEN-ELSEIF statement, an IF-THEN-ELSEIF-ELSE statement, or a SWITCH statement in an item of software. Again, it is a question of identifying the condition to be protected, and protecting the section of code relating to that condition. In particular, the section of code which is executed when the condition is satisfied will be the one to be protected. See also the description in Appendix 3 relating to FIGS. 6A-7B.

Variations

The present method 800 may further comprise a step of identifying a condition to be obfuscated. In order to enable protection software to automatically identify a condition to be obfuscated, it is desirable for a software programmer or security engineer to annotate the initial item of software so as to identify the critical decisions to be protected so that the compilation process can perform the desired diluting and diffusing. Alternatively, the critical conditions for protection may be identified manually without the need to annotate the software. It is also desirable for the software programmer or security engineer to annotate which part(s) of the decision need to be protected (e.g. THEN or ELSE or THEN & ELSE portions of an IF-THEN-ELSE statement). It is also desirable for the software programmer or security engineer to annotate whether a decision branch not being protected may be removed completely (see parts (c) and (d) of FIG. 11).

The present method 800 may further comprise a step of identifying the one or more condition variables upon which the condition depends. The present method 800 may further comprise a step of identifying a code block in the item of software where a condition variable (e.g. check) is assigned a value that is subsequently used to test whether the condition is satisfied.

The present method 800 may further comprise reformulating the (original) condition to produce a new condition, where the new condition is based on at least one of the new variables, which themselves depend on the condition variable(s). The new condition is set up such that it is satisfied if the (original) condition is satisfied, and it is not satisfied if the (original) condition is not satisfied. The present method 800 may then further comprise modifying the item of software such that at least part of the control flow is dependent on whether the new condition is satisfied. Thus, the protected code may still comprise a portion of conditional code, but with the condition itself obfuscated.

The present method 800 may further comprise modifying the portion of the item of software such that at least one instance of at least one of the one or more condition variables is replaced by an equivalent expression based on at least one of the new variables. This means that a successful attack must tamper with the new variable in addition to the conditional variable(s).

The present method 800 may further comprise inserting a branch point in the control flow in the modified portion (e.g. code segment 900B) of the item of software, where the control flow path taken from said branch point is independent of whether the condition is satisfied. In other words, it is possible to further obfuscate a diffused and diluted decision by inserting one or more dummy decision points (i.e. branch points) into the code. This makes it even harder for an attacker to successfully attack the code since the complexity has been artificially increased.

According to the present method, subsequent to the modified portion (e.g. code segment 900B) of the item of software, the control flow through the item of software may vary dependent on whether the condition is satisfied.

Whilst the example described above with reference to Appendices 1 and 2 included only a single condition variable (i.e. check), it will be understood that the method 800 may equally be applied to obfuscate a condition whose satisfaction is based on more than one condition variables.

4—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a Blu-ray disc), or a memory (such as a ROM, a RAM, EEPROM, EPROM, Flash memory or a portable/removable memory device), etc. The transmission medium may be a communications signal, a data broadcast, a communications link between two or more computers, etc.

APPENDIX 1

| Exemplary initial item of software programmed in C-like code |
|---|
| [P1-Line 01] Int example_function (int a[ ]) { |
| [P1-Line 02] "Assume that input array, a, has 6 elements, and return an integer as computation results. |
| [P1-Line 03] In this program, a[0] is a format mark that indicates two different formats for interpret the data structures." |
| [P1-Line 04] unsigned int m1 = 1, format, check, c1, c2, k1, k2, result; |
| [P1-Line 05] format = a[0]; |
| [P1-Line 06] "Structure proper data from input data array" |
| [P1-Line 07] If (format == m1) then { |
| [P1-Line 09]    c1 = a[1]; |
| [P1-Line 10]    c2 = a[2]; |
| [P1-Line 11]    check = a[3]; |
| [P1-Line 12]    k1 = a[4]; |
| [P1-Line 13]    k2 = a[5]; |
| [P1-Line 14] } |
| [P1-Line 15] Else { |
| [P1-Line 16]    check = a[1]; |
| [P1-Line 17]    c1 = a[4]; |
| [P1-Line 18]    c2 = a[5]; |
| [P1-Line 19]    k1 = a[1]; |
| [P1-Line 20]    k2 = a[2]; |
| [P1-Line 21] }; |
| [P1-Line 22] If (check != 1) Then { |
| [P1-Line 23]    "The check fails, go to generate garbage as the result." |
| [P1-Line 24]    k2 = k1 * k2 * c1; |
| [P1-Line 25]    result = k2 * c1 * c2; |
| [P1-Line 26] } Else { |
| [P1-Line 27]    "The check passes, go to generate right result based on different format and control data." |
| [P1-Line 28]    If (format == m1) then { |
| [P1-Line 29]      If (c1 > 0) then { |
| [P1-Line 30]        result = k1 + c1; |
| [P1-Line 31]      } |
| [P1-Line 32]      Else { |
| [P1-Line 33]        result = k1 − c1; |
| [P1-Line 34]      } |
| [P1-Line 35]    } |

APPENDIX 1-continued

Exemplary initial item of software programmed in C-like code

| | |
|---|---|
| [P1-Line 36] | Else { |
| [P1-Line 37] |    If (c2 > 0) then { |
| [P1-Line 38] |      result = k2 + c2; |
| [P1-Line 39] |    } |
| [P1-Line 40] |    Else { |
| [P1-Line 41] |      result = k2 − c2; |
| [P1-Line 42] |    } |
| [P1-Line 43] | } |
| [P1-Line 44] | }; |
| [P1-Line 45] | Return result; |

APPENDIX 2

Exemplary protected item of software programmed in C-like code

| | |
|---|---|
| [P2-Line 1] | Int example_function (int a[ ]) { |
| [P2-Line 2] | "Assume that input array, a, has 6 elements, and return an integer as computation results. |
| [P2-Line 3] | In this program, a[0] is a format mark that indicates two different formats for interpret the data structures." |
| [P2-Line 4] | unsigned int m0 = 0, m1 = 1, format, check, c1, c2, k1, k2, result, d1, d2, d3, d4, d5; |
| [P2-Line 5] | format = a[0]; |
| [P2-Line 6] | d1 = 0; d2 = 0; d3 = 0; d4 = m1; d5 = 0; |
| [P2-Line 7] | "Structure proper data from input data array" |
| [P2-Line 8] | If (format == m1) then { |
| [P2-Line 9] |    c1 = a[1]; |
| [P2-Line 10] |    c2 = a[2]; |
| [P2-Line 11] |    check = a[3]; |
| [P2-Line 12] |    d1 = check; |
| [P2-Line 13] |    k1 = a[4]; |
| [P2-Line 14] |    k2 = a[5]; |
| [P2-Line 15] |    d3 = d1 + m0; |
| [P2-Line 16] |    d4 = d4 + m1; |
| [P2-Line 17] |    d5 = d4 + m1; |
| [P2-Line 18] | } |
| [P2-Line 19] | Else { |
| [P2-Line 20] |    d2 = a[1]; |
| [P2-Line 21] |    check = d2; |
| [P2-Line 22] |    d3 = check + m0; |
| [P2-Line 23] |    **d4 = 2 * d4 + m0;** |
| [P2-Line 24] |    c1 = a[4]; |
| [P2-Line 25] |    c2 = a[5]; |
| [P2-Line 26] |    d5 = d4 + d3; |
| [P2-Line 27] |    k1 = a[1]; |
| [P2-Line 28] |    k2 = a[2]; |
| [P2-Line 29] | }; |
| [P2-Line 30] | If (format == m1) then { |
| [P2-Line 31] |    If (c1 > 0) then { |
| [P2-Line 32] |      result = k1 **\* (d4 - (d1 + d2 + d3) + m1)** + c1 **\* (d5 - (d1 + d2 + d3))**; |
| [P2-Line 33] |    } |
| [P2-Line 34] |    Else { |
| [P2-Line 35] |      result = k1 **\* (d5 - (2\*d1 + d2))** − c1 **\* (d4 - (d1 + d2 + d3) + m1);** |
| [P2-Line 36] |    } |
| [P2-Line 37] | } |
| [P2-Line 38] | Else { |
| [P2-Line 39] |    If (c2 > 0) then { |
| [P2-Line 40] |      result = k2 **\* (d5 - (d4 + d2) + d3)** + c2 **\* (d4 - d1 − d2 ));** |
| [P2-Line 41] |    } |
| [P2-Line 42] |    Else { |
| [P2-Line 43] |      result = k2 **\* (d5 - d4)** − c2 **\* (d4 − d3 + d1 ));** |
| [P2-Line 44] |    } |
| [P2-Line 45] | }; |
| [P2-Line 46] | Return result; |

Appendix 3: Conditional Block Replacement

There is described a first method of protecting an item of software to produce a protected item of software, the item of software comprising conditional code which is arranged to set the value of a program variable according to a predetermined first function in response to a first condition being satisfied, wherein the first condition is based on one or more condition variables, the method comprising: determining a second function which is based, at least in part, on the one or more condition variables and which evaluates to the same value as the predetermined first function when the first condition is satisfied by the one or more condition variables; and replacing the conditional code with replacement code, wherein the replacement code comprises a first portion of code which is arranged to set the value of the program variable according to the second function irrespective of whether the first condition is satisfied by the one or more condition variables.

The conditional code may comprise alternative code which is arranged to perform a predetermined operation in response to a second condition being satisfied, wherein the second condition is different to the first condition, and wherein the replacement code further comprises a second portion of code subsequent to the first portion of code, the second portion of code being arranged to perform the predetermined operation in response to the second condition being satisfied.

The second condition is the logical complement of the first condition.

The conditional code may comprise an IF-THEN-ELSE statement comprising an IF section of code comprising an explicit condition, a THEN section of code arranged to be executed in response to the explicit condition being satisfied and an ELSE section of code arranged to be executed in response to the explicit condition not being satisfied, wherein the explicit condition is the first condition such that the THEN section of code is arranged to set the value of the program variable according to the first predetermined function in response to the explicit condition being satisfied, and wherein the ELSE section of code comprises the alternative code.

The conditional code may comprise an IF-THEN-ELSE statement comprising an IF section of code comprising an explicit condition, a THEN section of code arranged to be executed in response to the explicit condition being satisfied and an ELSE section of code arranged to be executed in response to the explicit condition not being satisfied, wherein the explicit condition is the second condition such that the ELSE section of code is arranged to set the value of the program variable according to the predetermined first function in response to the first-condition being satisfied, and wherein the THEN section of code comprises the alternative code.

The second condition may not be the logical complement of the first condition.

The alternative code may be further arranged to perform one or more further predetermined operations in response to one or more respective further conditions being satisfied, wherein, for each further predetermined operation, the replacement code comprises a respective further portion of code subsequent to the first portion of code, the respective further portion of code being arranged to perform said further predetermined operation in response to the respective further condition being satisfied.

The second condition and the one or more respective further conditions may collectively represent the logical complement of the first condition.

The second condition and the one or more respective further conditions may not collectively represent the logical complement of the first condition.

The alternative code may comprise code arranged to set the value of the program variable.

The replacement code may define one or more extra variables, wherein each extra variable is respectively based, at least in part, on at least one of the one or more condition variables, the second function may be based, at least in part, on the one or more extra variables.

The second function may not be directly based on a subset of the one or more condition variables, in which case, for each of the condition variables in the subset, at least one of the one or more extra variables is based, at least in part, on that condition variable.

The second function may be further based, at least in part, on one or more dummy variables which are not based on the one or more condition variables.

At least one of the one or more of the dummy variables may be a constant value.

At least one of the one or more dummy variables may be defined in the replacement code.

At least one of the one or more dummy variables may already be defined in the item of software.

The program variable may be one of the one or more condition variables.

The program variable may not be one of the one or more condition variables.

The predetermined first function may be based, at least in part, on at least one of the one or more condition variables.

The predetermined first function may not be based on the one or more condition variables.

The method may further comprise: identifying, within the item of software, the conditional code which is to be replaced by the replacement code.

There is described a first apparatus arranged to carry out the first method. There is described a first computer program which, when executed by a processor, causes the processor to carry out the first method. There is described a computer-readable medium storing the first computer program.

There is described a second method of producing a computer program product comprising protecting an item of software to produce a protected item of software by carrying out the first method and generating the computer program product based, at least in part, on the protected item of software.

There is described a second apparatus for protecting an item of software comprising: an input for receiving an item of software to be protected, the item of software comprising conditional code which is arranged to set the value of a program variable according to a predetermined first function in response to a first condition being satisfied, wherein the first condition is based on one or more condition variables; an output for outputting a protected item of software; and processing means for producing the protected item of software from the item of software to be protected by: determining a second function which is based, at least in part, on the one or more condition variables and which evaluates to the same value as the predetermined first function when the first condition is satisfied by the one or more condition variables; and replacing the conditional code with replacement code, wherein the replacement code comprises a first portion of code which is arranged to set the value of the program variable according to the second function irrespective of whether the first condition is satisfied by the one or more condition variables.

There is described a third apparatus for producing a computer program product comprising: an input for receiving a protected item of software from the second apparatus; an output for outputting the computer program product; and processing means for generating the computer program product based, at least in part, on the protected item of software.

Figure 3:
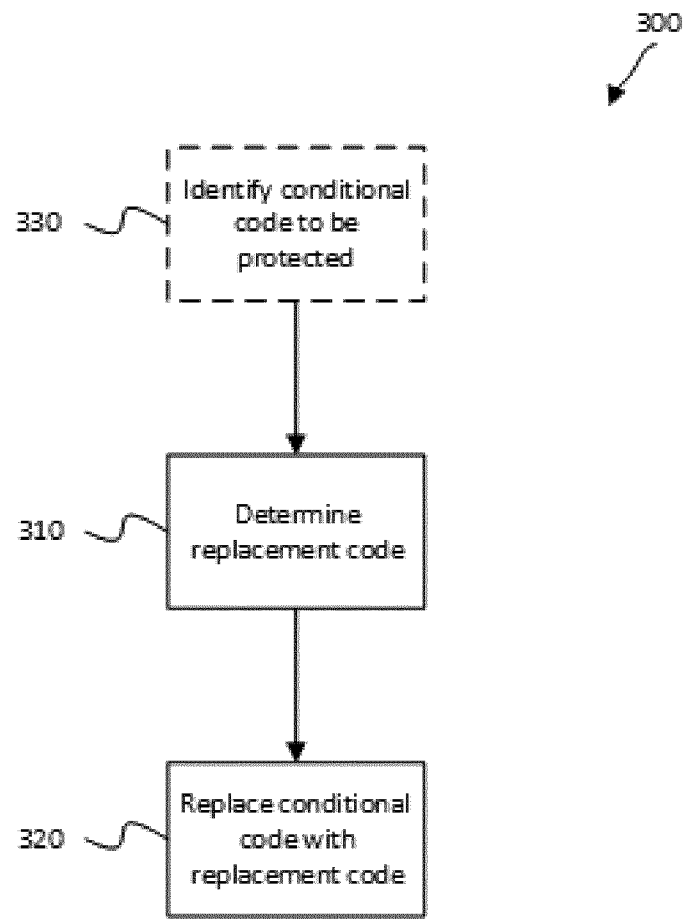
FIG. 3 schematically illustrates a method 300 of protecting an item of software.

FIG. 3 schematically illustrates a method 300 operable to protect an initial item of software 220 to produce a protected item of software 260. The method 300 comprises the steps of determining 310 replacement code to replace conditional code within the initial item of software 220 and replacing 320 the conditional code with the replacement code in order to produce the protected item of software 260. Optionally the method comprises an initial step of identifying 330 conditional code within the initial item of software 220 which is to be protected. The method 300 of FIG. 3 will be discussed in more detail further below with reference to FIGS. 4A and 4B.

FIG. 4A schematically illustrates an exemplary initial item of software 220 which may be protected using the method 300 of FIG. 3. The exemplary initial item of software 220 comprises an initial portion 410, a decision 420, conditional code 430 and a remaining portion 440.

The initial portion 410 of the initial item of software 220 is the first item to be processed if the item of software 220 were to be executed. In other words, the initial portion 410 is the first item in the execution path of the initial item of software 220. The initial portion 410 contains code specifying one or more instructions which are processed when the initial portion 410 is executed. Although the initial portion 410 has been illustrated in FIG. 4A as a basic block of code (i.e. containing a sequence of instructions which are to be executed sequentially one after the other), it will be appreciated that the initial portion 410 may also be more complex. As an example, the initial portion 410 may comprise additional decisions and conditional code other than the decision 420 and conditional code 430 shown in FIG. 4A. Indeed such additional decisions and conditional code could also be protected using the method 300 of FIG. 3 by separately considering those additional decisions and conditional code to be the condition 420 and conditional code 430 that are the subject of the method 300 and reformulating the contents of the initial portion 410 (and the remaining portion 440 discussed further below) appropriately. Furthermore, it will be appreciated that the initial item of software 220 might not comprise an initial portion 410, in which case the first item in the execution path of the initial item of software 220 is the decision 420. After processing the initial portion 410 of the initial item of software 220, the processing moves on to execute the decision 320 which is the next item in the execution path of the initial item of software 220.

The decision 420 represents a point in the program at which there a multiple execution paths which may be followed. The decision 420 determines which execution path should be followed (i.e. which code should be processed or executed next) by evaluating whether, or not, a condition is satisfied. The condition is based upon one or more variables (which may be referred to as "condition variables") within the program, such that the determination as to whether, or not, the condition is satisfied is dependent upon the value of such variables at the time the decision 420 is processed. If when the decision 420 is processed the condition is satisfied, the decision 420 will determine that conditional code 430 should be processed (or executed) next. However, if the condition is not satisfied when the decision 420 is processed, the decision 420 will determine that the remaining portion 440 of the initial item of software 220 should be processed next. In other words, the execution path labelled "yes" on FIG. 4A will be selected if the condition is satisfied, otherwise the execution path labelled "no" will be selected.

The conditional code 430 is processed if the condition upon which the decision 420 is based is satisfied; otherwise, conditional code 430 is not processed. In other words, the conditional code 430 is processed in response to the condition being satisfied. The conditional code 430 contains code specifying one or more instructions which are to be processed if the condition is satisfied. The conditional code 430 includes at least one instruction which sets (or assigns) the value of a variable (which may be referred to as the "program variable") according to a predetermined function. It will be appreciated that the conditional code 430 may also include instructions which carry out other operations.

The program variable is a variable which is accessible beyond the scope of the conditional code 430, such that the program variable may be used as part of the code in the remaining portion 440 of the initial item of software 220, and/or the program variable may be used as part of the code in the initial portion 410 of the initial item of software 220 prior to the assignment of a new value by the conditional code 430. Furthermore, the condition upon which the decision 420 is based may be based, at least in part, upon the program variable. In other words, the program variable may be one of the one or more "condition variables".

The predetermined function is a function which sets the value of the program variable. The predetermined function may set the value of the program variable to a constant value. The predetermined function may be based, at least in part, on one or more of the condition variables. As previously mentioned, the program variable itself may be one of the condition variables such that the new value for the program variable may be based, at least in part, on the program variable's current value. The predetermined function may be based, at least in part, on any other variable within the item of software. The predetermined function may be expressed simply, for example as a single assignment in a single line of code or it may be expressed in a more complex manner. As an example, the predetermined function could be expressed as multiple assignments to the program variable on multiple lines of code within the conditional code 430. The conditional code may also comprise its own sub-decisions and sub-conditional code, such that the predetermined function is expressed conditionally (i.e. based on the conditions associated with the sub-decisions).

In summary, the conditional code 430 is arranged to set the value of a program variable according to a predetermined function in response to a condition being satisfied, the condition being based on one or more condition variables. Once the conditional code has been processed, the processing will proceed to execute the remaining portion 440 of the initial item of software 220.

The remaining portion 440 of the initial item of software 220 is the last item in the execution path regardless of which execution path is followed after decision 420. If the condition for the decision 420 was satisfied, the remaining portion 440 is executed following on from the processing of the conditional code 430. Otherwise, if the condition for the decision 420 was not satisfied, the remaining portion 440 is executed following on from the processing of the decision 420. The remaining portion 440 contains code specifying one or more instructions which are processed when the remaining portion 440 is executed. Although the remaining portion 440 has been illustrated in FIG. 4A as a basic block of code, it will be appreciated that, as for the initial portion 410 of the initial item of software 220, the remaining portion 440 may be more complex. Therefore, the remaining portion 440 may also contain additional decisions and conditional code other than the decision 420 and conditional code 430 shown in FIG. 4A. Again, as for the initial portion 410, such additional decisions and conditional code could also be protected using the method 300 of FIG. 3 by separately considering those additional decisions and conditional code to be the condition 420 and conditional code 430 respectively that are the subject of the method 300 and reformulating the contents of the initial portion 410 and the remaining portion 440 appropriately. Furthermore, it will also be appreciated that the initial item of software 220 might not comprise a remaining portion 440, in which case the last item in the execution path of the initial item of software 220 is the conditional code 430, if the condition of the decision 420 is satisfied—otherwise the last item in the execution path is the decision 420.

Program decisions and conditional code are fundamental elements in the construction of most items of software.

Indeed, a common statement (or construct) that is available in many programming languages is the IF-THEN statement. The IF-THEN statement may be used to implement the initial item of software 220 as illustrated in FIG. 4A and discussed above. The IF-THEN statement has two sections, an IF section and a THEN section. The IF section allows a condition to be specified, whilst the THEN section allows code to be specified which will only be run if the condition specified in the IF section is satisfied. The IF section may therefore be used to specify the decision 420, whilst the THEN section may be used to specify the conditional code 430.

As an example, an item of software might be arranged to allow a user to view an encrypted item of content provided that the user is authenticated and/or authorised to view the item of content. The item of software might therefore have an initial portion 310 which carries out an authentication and/or authorisation routine and sets a variable specifying the authenticated username and/or a variable indicating whether the user is authorised to view the item of content. The item of software might then have a decision 420 which has an associated condition that the username variable must have been set (i.e. the user has been authenticated) and/or that the authorisation variable has a value which indicates that the user is authorised to view the item of content. The item of software may also have conditional code 430 which is arranged to be executed in response to the condition being satisfied (i.e. the user is authenticated and/or authorised to view the media item), the conditional code 430 being further arranged to set the value of a variable representing a decryption key for the encrypted item of content to a valid decryption key. Finally, the item of software may have a remaining portion 440 which decrypts the content item using the decryption key stored in the variable and displays it to the user. If at the decision 420 the condition was satisfied (i.e. the user is authenticated and/or authorised), then the variable will have been set to the value of a valid decryption key and the remaining portion 440 will correctly decrypt and display the content item to the user. However, if at the decision 420 the condition was not satisfied (i.e. the user is not authenticated and/or is not authorised to view the content), then the conditional code 430 will not be executed such that the decryption key variable will not have been set to a value of a valid decryption key. Therefore, when the processing proceeds to the remaining portion 440, the remaining portion 440 will not correctly decrypt the encrypted content item.

As discussed above, it is possible for an attacker provided with the initial item of software 220 to be able to force the initial item of software 220 to execute so that a path of execution is followed after processing the decision even though that path of execution was not meant to have been followed. As an example, a common technique that is used to attack decisions in programs is to run the application under a debugger and modify the code to take one specific execution path regardless of the condition variables. Clearly such attacks can have serious implications on items of software which rely on decisions to enforce constraints on the users of the items of software. With reference to the decryption key example above, there is clear motivation for an attacker to attempt to override the decision so that the decryption key is set to a valid decryption key so that the attacker can view the content item even if the condition that the user is authenticated and/or authorised is not satisfied. There are many types of decisions in items of software for which it is desirable to protect the outcome of that decision. Examples of fields in which the described method maybe particular applicable include access control, IP licensing management, digital rights management, online billing or e-voting. However, it will be appreciated that the described method can be applied more generally to protect decisions and conditional code in any kind of software item.

As discussed above, the method 300 for protecting the item of software, comprises the steps of determining 310 replacement code to replace conditional 430 code within the initial item of software 220 and replacing the conditional code 430 with the replacement code in order to produce the protected item of software 260.

FIG. 4B schematically illustrates a protected item of software that the method 300 produces when processing the initial item of software 220 illustrated in FIG. 4A. In the protected item of software 260, the decision 420 and conditional code 430 that were present in the initial item of software 220 have been replaced with replacement code 450 that was determined 310 by the method 300. The method 300 does not replace the initial portion 410 that was present in the initial item of software 220, nor does it replace the remaining portion 440 of the initial item of software 220. In other words, if the initial item of software 220 has an initial portion 410 and a remaining portion 440, these portions will also be present in the protected item of software. Whilst FIG. 4B illustrates a protected item of software 260 having a single decision 420 and conditional code 430 being protected by being replaced with conditional code 450, it will be appreciated that the method 300 may be used to protect multiple decisions and their respective conditional code by replacing each decision and its respective conditional code with replacement code for that decision so as to produce a protected item of software 260 which has multiple sections of replacement code. As an example, the method 300 may be performed iteratively to protect multiple decisions within the initial item of software. The method 300 may replace 320 a first decision in the initial item of software 220 in a first iteration, producing an intermediate protected item of software (i.e. with only one of the decisions having been protected). The method 300 may then perform further iterations on the intermediate protected item of software until each of the decisions that are to be protected have been replaced 320 with replacement code to produce the protected item of software 260. It may be, for example, that the method 300 is performed once to replace 320 a first decision in the initial item of software, producing a first protected item of software, and that the method 300 is then performed a second time on the first protected item of software to replace 320 a second decision and produce the final protected item of software 260. Alternatively, it will be appreciated that multiple decisions in the initial item of software could be replaced 320 simultaneously.

The replacement code 450 that is created by the method 300 comprises a first portion of code which sets the program variable according to a function (referred to as the "replacement function") that is determined 310 by the method 300. The decision 420 is removed when it is replaced 320 by the replacement code 450 meaning that the first portion of the replacement code will always be processed irrespective of whether the condition upon which the original decision 420 was based is satisfied or not. Therefore, in the protected item of software 260, the first portion of the replacement code will always set the value of the program variable according to the replacement function.

The replacement function that is determined 310 by the method 300 is formulated so that it is based, at least in part, on the one or more condition variables (i.e. the variables upon which the condition associated with the original decision is based) such that it evaluates to the same value as the original predetermined function in the condition code 430 when the condition is satisfied. If the condition is not satisfied, then ideally the output of the replacement function should be different from that of the original predetermined function. It will be appreciated that, depending on the formulation of the replacement function, the output of the replacement function may occasionally provide the same output as the original predetermined function even if the condition is not satisfied (e.g. if a random number generator were used in the replacement function). However, provided that the output is normally different from that of the original predetermined function when the condition is not satisfied, then attacks on the replacement code 450 will be more difficult (i.e. the resilience of the replacement code 450 to attack is higher).

There are a variety of ways in which the replacement function may be formed. One such technique of forming the replacement function is to combine at least one transformation function g (or transform function) with one or more of the terms of the original predetermined function (e.g. the transform function may be appended or prepended to one or more terms of the original predetermined function). The transform functions are formed so that they are based, at least in part, on the condition variables (i.e. $g(cv_1, cv_2, \ldots, cv_k)$). The transform functions are formed so that if the condition upon which the decision 420 was based in the initial item of software 220 is satisfied, the transform function takes on an identity value which does not alter the value of the term of the original predetermined function with which it is combined. However, if the condition upon which the decision 420 was based is not satisfied, the transform function takes on a non-identity value, which does alter the value of the term of the original predetermined function with which it is combined.

There are two fundamental types of transform functions which will now be considered. These types differ in the manner in which they are combined with the terms of the original function.

The first such type of transform function can be combined with terms of the original predetermined function using the multiplication operation (otherwise referred to as a multiplication transform function). As an example, if the original function in the initial item of software 220 operates to set the program variable z according to the following function:

$z=x+y$ then a multiplication transform function $g_m$ can be combined with the x term of the original function using the multiplication operation to produce a replacement function as follows:

$z=(x*g_m(cv_1,cv_2,\ldots,cv_k))+y$

As will be appreciated, the identity value under normal multiplication is 1, since multiplying a value by 1 does not alter its value, whereas multiply a value by anything other than 1 will alter its value. Therefore, in the case of the multiplication transform function, the function should be formed so that it takes a value of 1 if the condition upon which the decision in the initial item of software 220 is based is satisfied and any other value otherwise. This means that the program variable z will be set to the value x+y if the condition is satisfied, but to some other value otherwise (if the condition is not satisfied).

A second type of transform function can be combined with the original function using the addition operation (otherwise referred to as an addition transform function). An addition transform function $g_a$ can be combined with the x term of the original function mentioned above to produce a replacement function as follows:

$z=(x+g_a(cv_1,cv_2,\ldots,cv_k))+y$

As will be appreciated, the identity value under normal addition is 0, since adding 0 to a value will not alter the value, whereas adding anything other than 0 will alter the value. Therefore, in the case of the addition transform function, the function should be formed so that it takes a value of 0 if the condition upon which the decision in the initial item of software 220 is based is satisfied and any other value otherwise. This means that the program variable z will be set to the value x+y if the condition is satisfied, but to some other value otherwise (if the condition is not satisfied).

Whilst the above examples show a transform function being applied to the first term (i.e. x) in the original function, it will be appreciated that transform functions may be applied to any (or all) of the terms in the original function and that more than one transform function may be applied to the same term. Furthermore, the transform functions that are applied to the original function may each be different from each other and may also be different kinds of transform functions—that is to say a mixture of both multiplication transform functions and addition transform functions may be used together.

As an example, the method 300 could make use of a database to retrieve predefined transform functions which can be parameterised in order to determine 310 the replacement function for the replacement code 450. Alternatively, the method 300 may make use of transform function generator to generate the transform functions. Algebraic simplifiers provide a ready source of such transform function identities, and more can be found which are especially relevant to computer computations in the Book "*Hacker's Delight*" by Henry S. Warren (ISBN 978-0-201-91465-8).

It will be appreciated that other ways of forming the replacement function may be used provided that the replacement function is based at least in part on the condition variables upon which the decision 420 was based in the initial item of software 220 and that the replacement function evaluates to the same as the original function when the condition is satisfied.

In summary, at a step 310, the method 300 determines a replacement function which is based, at least in part, on the one or more condition variables upon which the condition of the decision 420 in the initial item of software 220 was based. The replacement function evaluates to the same value as the original predetermined function in the conditional code 430 of the initial item of software 220 when the condition variables satisfy the condition. The method 300 then replaces 320 the conditional code 430 with replacement code 450 which includes a first portion of code which sets the value of the program variable according to the replacement function regardless of whether or not the condition is satisfied by the condition variables.

The replacement code 450 that is determined 310 by the method 300 is executed regardless of whether the condition is satisfied by the condition variables. Therefore, the decision 420 is no longer explicitly included in the protected item of software 260. Instead, the program variable, which was set according to a function by the conditional code 430 when a condition is satisfied, is now set according to the replacement function regardless of whether or not the condition is satisfied. This means that the decision 420 has been masked in the protected item of software 260 because it is no longer apparent that the item of software is behaving differently at this point depending on whether a condition is satisfied. In the initial item of software 220 the difference in behaviour is readily apparent, as there is conditional code which is only executed if the condition is satisfied, whereas in the protected item of software 260 the software behaves in a similar manner regardless of whether the condition is satisfied—i.e. the program variable is set to a value according to the replacement function. The effects of the condition not being satisfied in the protected item of software 260 are only made apparent later on in the software when the program variable is used, since the value of the program variable will only be correct of the condition was satisfied. This means that the decision 420 (which may be considered to be implicit in the protected item of software 260, as opposed to explicit in the initial item of software 220), is much harder for an attacker to identify and tamper with, particularly since the effects of the decision may be separated from the code that caused the change in behaviour due to the decision.

The operation of the method 300 will now be discussed in greater detail in relation to FIGS. 5A, 5B, 6A, 6B, 7A and 7B.

Figures 5A, 5B:
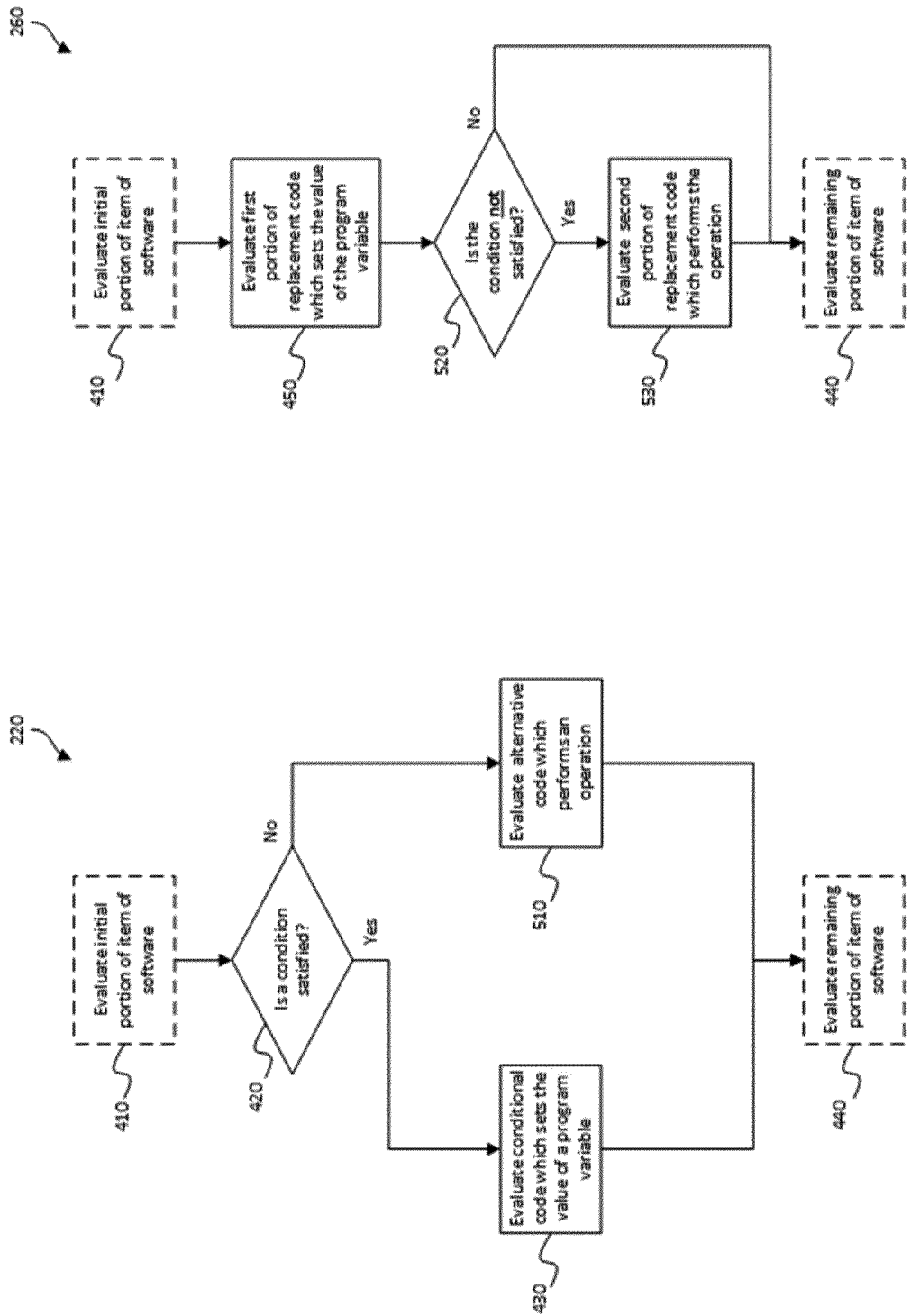
FIG. 5A schematically illustrates another initial item of software 220 that may be protected by the method 300 illustrated in FIG. 3.
FIG. 5B schematically illustrates a protected item of software 260 which may be produced from the initial item of software 220 illustrated in FIG. 5A by the method 300.
Figure 6B:
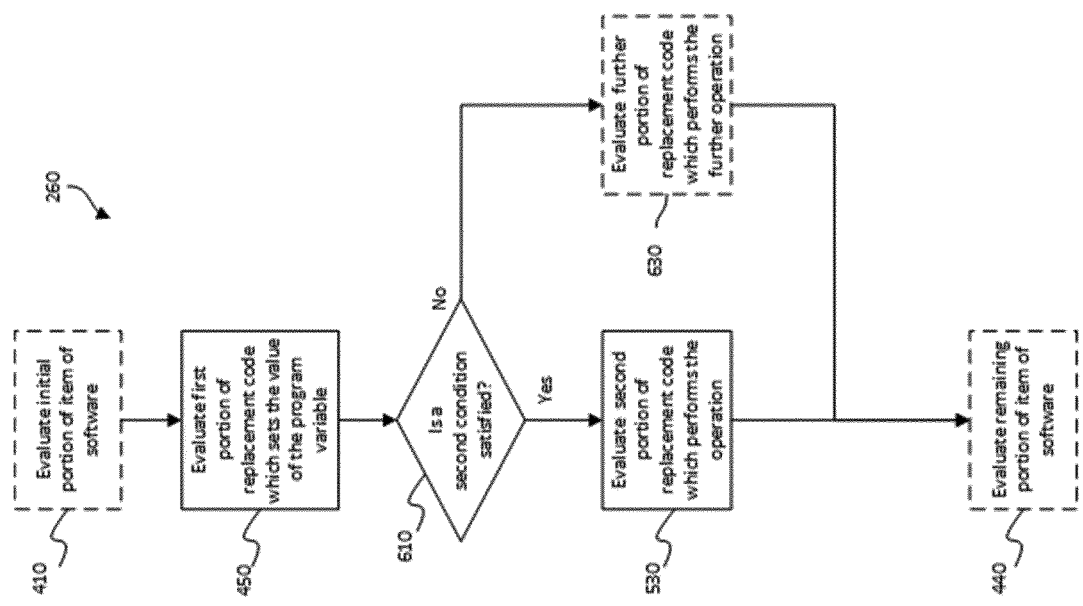
FIG. 6B schematically illustrates a protected item of software 260 which may be produced from the initial item of software 220 illustrated in FIG. 6A by the method 300.
Figure 6A:
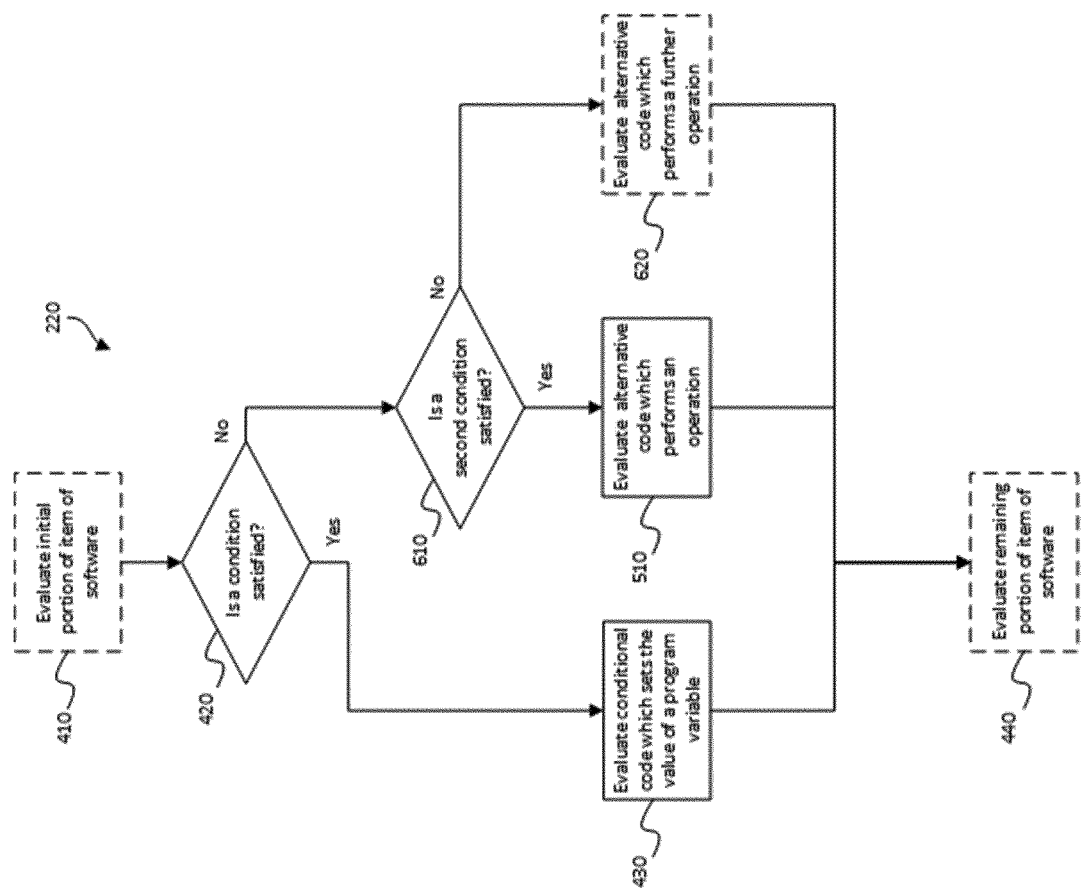
FIG. 6A schematically illustrates another initial item of software 220 that may be protected by the method 300 illustrated in FIG. 3.
Figure 7B:
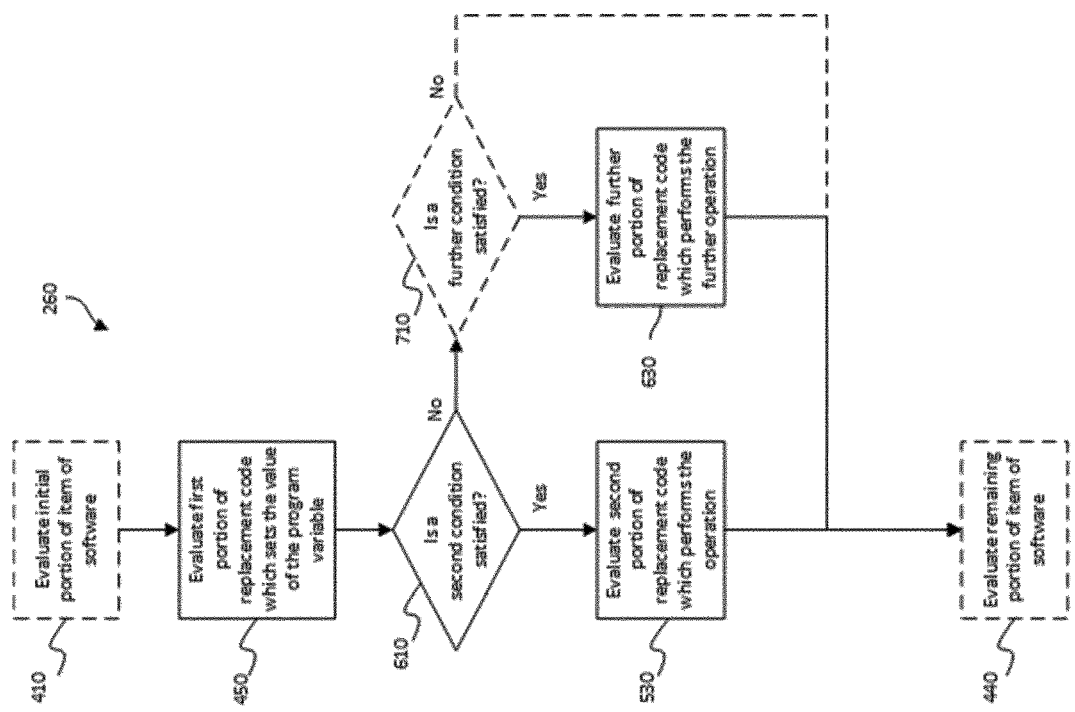
FIG. 7B schematically illustrates a protected item of software 260 which may be produced from the initial item of software 220 illustrated in FIG. 7A by the method 300.
Figure 7A:
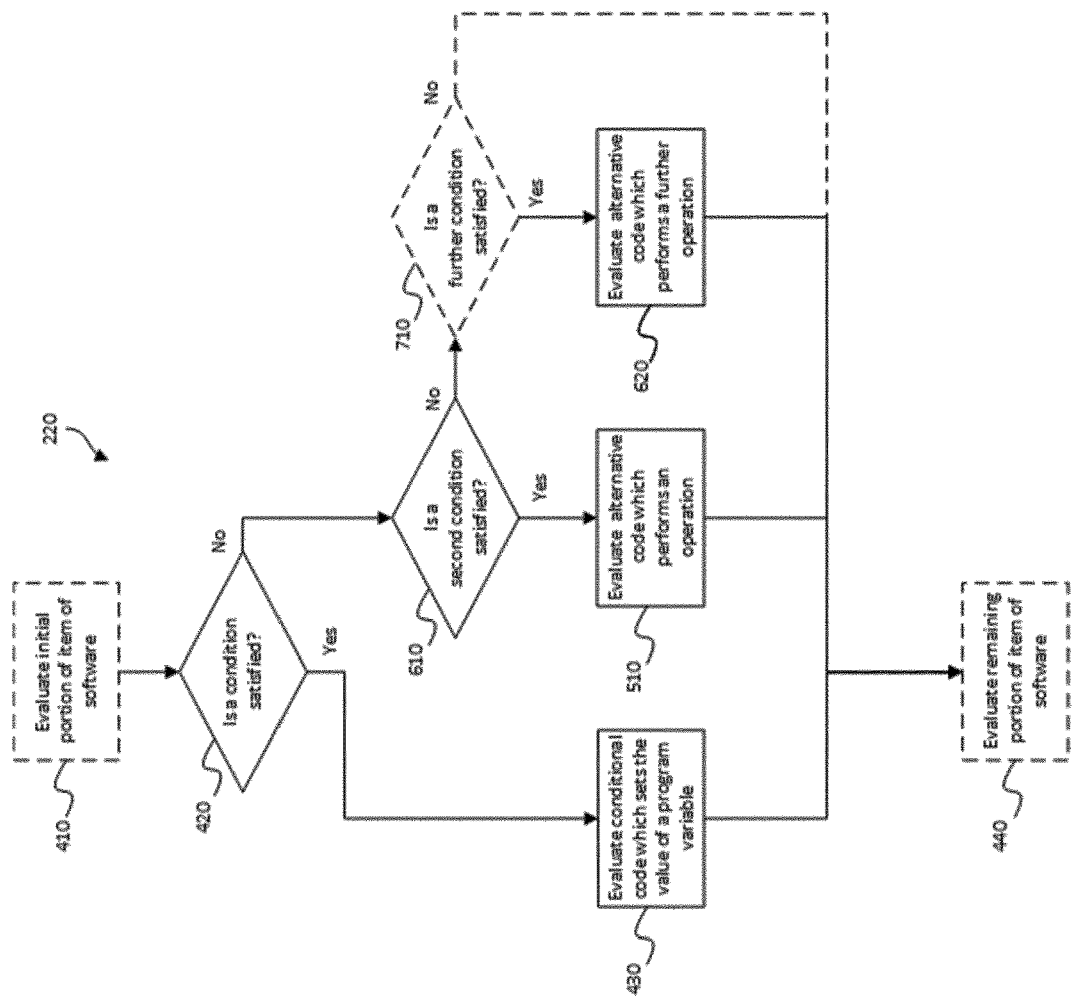
FIG. 7A schematically illustrates another initial item of software 220 that may be protected by the method 300 illustrated in FIG. 3.

FIGS. 5A, 6A and 7A schematically illustrate variations of the initial item of software 220 which may be protected by the method 300, whilst FIGS. 5B, 6B and 7B show the resulting variations of the protected item of software 260 that is produced by the method for each of the initial items of software 220 respectively.

In general, FIGS. 5A, 6A and 7A illustrate initial items of software 220 which comprise alternative code which is arranged to carry out other operations when the condition of decision 420 is not satisfied. The replacement code determined 310 by the method 300 generally acts to keep the alternative code dependent upon the same condition being decided in the protected item of software 260. In other words, only the conditional code (relating to when the condition is satisfied) is changed so that it is no longer dependent on its associated condition being satisfied.

FIG. 5A schematically illustrates another initial item of software 220 that may be protected by the method 300 illustrated in FIG. 3. However, the initial item of software 220 illustrated in FIG. 5A additionally includes alternative code 510.

The alternative code 510 is arranged to be executed in response to the condition upon which the decision 420 is based not being satisfied. That is to say, at decision 420, if the condition is not satisfied, the decision will determine that the alternative code 510 should be processed next. The alternative code may carry out a number of predetermined operations, such as, for example, setting the value of the program variable to a different value or setting the values of other variables. After the alternative code 510 has been processed, the processing proceeds to evaluate the remaining portion 440 of the initial item of software 220.

In addition to the IF-THEN statement discussed above, many programming languages offer an IF-THEN-ELSE statement. The IF-THEN-ELSE statement may be used to implement the initial item of software 220 illustrated in FIG. 5A. The IF-THEN-ELSE statement has three sections, an IF section, a THEN section and an ELSE section. The IF and THEN sections of the IF-THEN-ELSE statement operate in a similar manner as for the IF-THEN statement discussed above. The ELSE section allows code to be specified which will only be run if the condition specified in the IF section is not satisfied. The ELSE section may therefore by used to specify the alternative code 510. Whilst the IF-THEN-ELSE statement only has one condition that is explicitly stated in the IF section, it is possible to view the IF-THEN-ELSE section as having two conditions associated with it. A first condition would be the one explicitly stated in the IF section whilst a second condition is implicit from the IF section as the logical complement to the first condition. The ELSE section can therefore be considered as being arranged to be executed in response to the second condition. The IF-THEN-ELSE statement could therefore be re-written as two separate IF-THEN statements using two conditions which are the logical complement of each other. Alternatively, the IF-THEN-ELSE statement could be rewritten by changing the IF section to explicitly recite the condition of the previous ELSE section (i.e. the logical complement of the previous IF section) and the placing the code from the previous ELSE section into the THEN section and the code from the previous THEN section into the ELSE section. It can therefore be considered as somewhat arbitrary as to which of the two conditions is explicitly stated in the IF section and which code is placed in the THEN or ELSE sections, provided the relationships between the code and the respective condition to which it is responsive are maintained. Therefore, the initial item of software shown in FIG. 5A could be alternatively represented with the logical complement of the condition being used for the decision 420. In this case, the conditional code which sets the value of the program variable is arranged to be executed in response to the condition not being satisfied (i.e. on the execution path labelled "No" in FIG. 5A), whereas the alternative code would be arranged to be executed in response to the condition being satisfied (i.e. on the execution path labelled "Yes" in FIG. 5A).

FIG. 5B schematically illustrates a protected item of software 260 which may be produced from the initial item of software 220 illustrated in FIG. 5A by the method 300.

As before, the method comprises a step of determining 310 replacement code which determines a first portion 450 of replacement code which sets a variable according to a replacement function to replace the conditional code 430, as discussed in greater depth above. In the case illustrated in FIG. 5B, the step of determining 310 replacement code also determines a second portion 530 of replacement code, which is arranged to perform the same operations as the alternative code 510 of the initial item of software 220 and which is further arranged to be processed in response to a decision 520 that a condition is satisfied. The second portion 530 is therefore equivalent to the alternative code 510 and is dependent on the same condition being satisfied for its execution (i.e. the logical complement of the decision 420). It should be noted that the second portion 530 of the replacement code is arranged to be performed after the first portion 450 of the replacement code. This is because, as discussed above, the first portion 450 of the replacement code sets the value of the program variable regardless of whether the condition is satisfied or not. Therefore, if the alternative code is arranged to set the value of the program variable to a different value, the first portion 450 of the replacement code would always overwrite that value if the first portion 450 were processed before the second portion of the replacement code.

FIG. 6A schematically illustrates another initial item of software 220 that may be protected by the method 300 illustrated in FIG. 3. As discussed in relation to FIG. 5A, the alternative code 510 can be considered to be responsive to an implicit second condition, the implicit second condition being the logical complement of the condition upon which the decision 420 is based. In FIG. 6A, this second condition is explicitly associated with a second decision 610. The second decision 610 is arranged to be evaluated if the condition for the decision 420 is not satisfied, whilst the alternative code 510 is arranged so that it is only processed if the second condition is satisfied. Otherwise, if the condition for the decision 420 is not satisfied and the condition for the second decision 610 is not satisfied, the processing will proceed to evaluate the remaining portion 440 of the item of software. Naturally, if the second condition is the logical complement of the condition on which the decision 420 was based, then the initial item of software 220 illustrated in FIG. 6A is functionally equivalent to that illustrated in FIG. 5A, but with the second condition explicitly stated. However, the second condition need not be the logical complement of the condition on which the decision 420 was based.

In addition to the IF-THEN and IF-THEN-ELSE statements discussed above, many programming languages also offer an IF-THEN-ELSEIF statement which may be used to implement the arrangement illustrated in FIG. 6A. The IF-THEN-ELSEIF statement has three sections, an IF section, a THEN section and an ELSEIF section. The IF and THEN sections of the IF-THEN-ELSEIF statement operate in a similar manner as for the IF-THEN and IF-THEN-ELSE statements discussed above. The ELSEIF section allows a second condition to be specified, as well as alternative code, which will only be processed if the IF condition is not satisfied and the ELSEIF condition is satisfied. The ELSEIF section may therefore be used to specify the second decision 610, as well as the alternative code 510.

The initial item of software 220 illustrated in FIG. 6A may optionally also contain additional alternative code 620 (shown with a dashed line), which is arranged to be processed in response to the second condition not being satisfied. This means that at least part of the alternative code 510 or 620 will be executed if the condition associated with the decision 420 is not satisfied. Many programming languages contain an IF-THEN-ELSEIF-ELSE statement which may be used to implement this arrangement.

FIG. 6B schematically illustrates a protected item of software 260 which may be produced from the initial item of software 220 illustrated in FIG. 6A by the method 300. The protected item of software 260 illustrated in FIG. 6B is similar to that illustrated in FIG. 5B except that the decision 610 is based on the second condition which need not be the logical complement of the condition upon which the first decision 420 was made.

If the initial item of software 220 illustrated in FIG. 6A includes the optional additional alternative code 620, then the protected item of software 260 of FIG. 6B contains a further portion 630 of replacement code (also shown with a dashed line). The further portion is arranged to be executed if the decision 610 determine that the second condition is not satisfied. The further portion is further arranged to carry out the same operations when processed as the additional alternative code 620.

FIG. 7A schematically illustrates another initial item of software 220 that may be protected by the method 300 illustrated in FIG. 3. The initial item of software 220 illustrated in FIG. 7A is again very similar to that illustrated in FIG. 6A discussed above. It illustrates that further decisions 710 can be based on further conditions being satisfied, with further alternative code portions 620 being arranged to be executed if the further conditions are satisfied. Whilst FIG. 7A only shows one further decision 710 with an associated further condition it will be appreciated that any number of further decisions may be chained (or linked) together, each further decision being evaluated if the condition associated with the previous decision in the chain is not satisfied.

In addition to the IF-THEN, IF-THEN-ELSE and IF-THEN-ELSEIF statements mentioned above, many programming languages include additional statements which may be used to implement the arrangement illustrated in FIG. 7A. One such statement is the IF-THEN-ELSEIF-ELSE statement, which should be self-explanatory given the descriptions of the other statements above. The IF-THEN-ELSEIF-ELSE statement is similar to the IF-THEN ELSEIF-ELSE statement but with an ELSE section at the end. The ELSE section is arranged to be processed if the condition associated with the ELSEIF section is not satisfied (and, of course, provided that the condition associated with the IF section is not satisfied). The inclusion of the ELSE statement at the end ensures that the one or more further conditions defined in the ELSEIF sections (it will be appreciated that there may be more than one ELSEIF section in either the IF-THEN-ELSEIF statement or the IF-THEN-ELSEIF-ELSE statement) together with the implicit condition defined by the ELSE section collectively represent the logical complement of the condition specified in the IF section (i.e. the condition up which the decision 420 is based). FIG. 7B schematically illustrates a protected item of software 260 which may be produced from the initial item of software 220 illustrated in FIG. 7A by the method 300. The method 300 produces replacement code for the initial item of software 220 illustrated in FIG. 7A in a similar manner to that discussed above in relation to FIG. 6A. For each further condition 710 and further portion of alternative code 620, the replacement code that is determined 310 by the method 300 includes a corresponding decision 710 and portion of replacement code 630.

As discussed above, the replacement function that is determined 310 by the method 300 is formulated so that it is based, at least in part on the condition variables (i.e. the variables upon which the condition associated with the original decision 420). As part of the step of determining 310 the replacement code, the replacement code may define one or more extra variables. These extra variables are defined such that each is respectively based, at least in part, on at least one of the condition variables. The replacement function may then be based on those extra variables as well as, or instead of, the condition variables themselves. Where a particular one (or more) of the condition variables are not directly used in the replacement function, at least one of the one or more extra variables should be based, at least on part on those particular condition variables that are not directly used. This ensures that the replacement function is still based, albeit indirectly, on all of the condition variables. This ensures that the condition is represented in the variables of the replacement function.

In addition to the various types of "IF . . . " statements discussed above, many programming languages specify another statement which may be used to implement the arrangements illustrated in any of FIG. 4A, 5A, 6A or 7A, namely the SWITCH statement. The SWITCH statement contains an EXPRESSION section and one or more CASE sections, as well as an optional DEFAULT section. The EXPRESSION section contains an expression which can be evaluated to provide a value (which does not have to be Boolean). The CASE sections each have an associated value and are arranged to be executed if the value of the EXPRESSION section matches that value. In other words, each CASE section can be viewed as having an associated condition when combined with the expression of the EXPRESSION statement (i.e. the condition is when the value of the expression statement matches that of the CASE section). The optional DEFAULT section contains code which will be processed if none of the CASE sections When the SWITCH statement is processed, the CASE section having the matching value of the evaluated condition will be processed provided that such a CASE section exists, otherwise the DEFAULT section will be processed (again provided one exists). Therefore, to implement the arrangements illustrated in FIG. 4A, 5A, 6A or 7A using a SWITCH statement, an appropriate expression needs to be defined in the EXPRESSION section together with a CASE section associated with each explicit condition to be considered. The ELSE sections (i.e. the implicit condition that is the logical complement to the explicit condition) may then be specified in the DEFAULT section of the SWITCH statement.

The skilled person will be familiar with the IF-THEN, IF-THEN-ELSE, IF-THEN-ELSEIF, IF-THEN-ELSEIF-ELSE and SWITCH types of statement and their use to implement the arrangements illustrated in FIG. 4A, 5A, 6A or 7A. As will be appreciated from the above discussion based on FIGS. 4A, 4B, 5A, 5B, 6A, 6B, 7A and 7B, the method 300 provides the effect of decoupling a decision in an item of software from an associated control-flow path that may result from that decision. In essence, the method replaces the control-flow path with code that is not conditional upon the decision (i.e. it is no longer part of the decision). The replacement code will therefore execute irrespective of the decision being made, but will only produce a desired result if the condition associated with the first control flow path would have been satisfied. In other words, the visible control-flow behavior of the program no longer matches the significant decisions being taken within the program because the same code is executed in the protected item of software 260 regardless of the outcome of a significant decision (i.e. regardless of whether the condition is satisfied or not). The significant decision is therefore effectively hidden within the protected item of software 260. Indeed, the impact from the decision (i.e. the assigning of an intentionally 'incorrect' value) may only become apparent later on in the execution of the item of software (i.e. when the 'incorrect' value is to be used). Thus, it could be considered that the significant decision has been diffused and diluted throughout the item of software, making it much harder for an attacker to identify and tamper with the significant decision. It will be appreciated that the other control-flow paths that are not the subject of protection (i.e. which relate to insignificant decisions) may still be present in the protected item of software 260.

The replacement function may also be based, at least in part, upon one or more dummy variables. The dummy variables may be constant values or other variables in the item of software upon which the condition associated with decision 420 is not based. In other words, the dummy variables are not based on the one or more condition variables. The determination 310 of the replacement code may include defining dummy variables, which may be based on constant values or other variables within the item of software. However, existing variables within the initial item of software 220 may also be used as dummy variables upon which to base the replacement function.

The inclusion of extra and/or dummy variables in the formulation of the replacement function (i.e. such that the replacement function is based, at least in part, on the extra and/or dummy variables) means that it is harder still for an attacker to analyse the protected item of software. This is because the definition and inclusion of the extra and/or dummy variables requires an attacker to analyse larger amounts of code in order to analyse the replacement function. It is therefore desirable for the extra and/or dummy variables to be widely distributed and used within the item of software to further increase the amount of analysis that would be required for a successful attack. Where the method 300 is used to protect multiple decisions within an item of software (e.g. by applying the method 300 iteratively to each decision), the same extra and/or dummy variables may be used. This increases the analytical burden on an attacker yet further.

Referring back to FIG. 3, the method 300 may further include an optional first step of identifying 330 the conditional code that is to be protected. This step of identifying 330 identifies the decision 420 that is to be protected by the method 300. This could be achieved in a variety of ways.

As an example, the code for the initial item of software 220 may be augmented with annotations which specify the decisions within the initial item of software 220 which are to be protected by the method 300. The step of identifying 330 the conditional code may therefore involve identifying those decisions which have been annotated for protection. The annotations may include additional information, such as, for example, whether conditional or dummy variables are to be used in determining the replacement code and possibly how many variables should be created.

As an alternative example, a tool for running the method 300 could be embedded with a development environment which is used by the author (or developer) of the initial item of software 220. The tool might therefore allow the developer to choose to run the method 300 in relation to a particular selected block of conditional code which may replace the block of conditional code with generated replacement code within the development environment.

It will be appreciated that other ways of identifying 330 the conditional code that is to be protected may be used.

Appendix 1 shows an exemplary initial item of software 220 programmed in C-like code. As can be seen, the program includes various decisions expressed using IF-THEN-ELSE statements, such as on lines 7, 22, 28, 29 and 37. The majority of these decisions do not require protection from attack since they will not be of interest to an attacker. For example the decision on line 7 relates to a selection between different data formats that may be used and which is not a particularly useful target for an attacker to attempt to manipulate (since the program will already operate to select the correct format for the data there is little to be gained for an attacker in altering this behaviour). However, the decision on line 22 is critical. This decision determines the program's operation based on whether a "check" value is set to a correct value or not. If the "check" value is correct, then the program calculates a correct result based on the data format, however, if the "check" value is not correct, then the program calculates an intentionally incorrect result (i.e. garbage). This decision is relatively easy for an attacker to identify and is a likely target for an attacker to attempt to manipulate, since its successful manipulation can result in a desired output from the program for the attacker, where the program would not provide a desired output (i.e. it would output an intentionally incorrect value) otherwise. Therefore, it is desirable to use the method 300 to protect this decision.

Appendix 2 shows an exemplary protected item of software 260 that may be produced using the method 300. The differences between the code in Appendix 1 and Appendix 2 have been shown in bold and underlined.

Firstly, new variables have been defined on lines 4 and 6 of Appendix 2. These variables are a mixture of extra and dummy variables. For example, d1 is assigned the value of the condition variable "check" on line 12 making it an extra variable, meanwhile, the variable d3 is based on another variable m0 on line 15 making it a dummy variable, as discussed above.

Next, the IF-THEN-ELSE statement that was present in lines 22-26 and 44 of Appendix 1 has been removed. Multiplication transform functions, as described above, have been combined with the function which assigns a value to the program variable "result" on lines 32, 35, 40 and 43 of Appendix 2. It should be noted that whilst the code of Appendix 2 contains four separate assignment statements, these separate assignment statements can be collectively viewed as a single function which is assigned to the program variable "result". The multiplication transform functions are shown on lines 32, 35, 40 and 43 of Appendix 2 in bold and underlined. Each of these multiplication transform functions will evaluate to "1" if the value of the condition variable "check" is 1 (i.e. if the condition is satisfied) and to a different value otherwise. This means that the correct value will only be assigned if the condition is satisfied, otherwise a different value will be assigned. This is semantically similar to the operation of the initial item of software 220 illustrated in Appendix 1, even though the implementation is different.

As can be seen from appendices 1 and 2, the decision and its associated condition that is being protected is no longer explicitly recited by the code in the protected item of software 260—it is now implicit in the function that assigns the value to the program variable "result". This means it is harder for an attacker to identify that a decision is being made as well as the condition upon which it is based. Furthermore, a lot more analysis of the program code is required in order to manipulate the operation of the program to achieve the attacker's desired outcome.

There has been described a method for decoupling decision code in an item of software from an associated first control-flow path, the decision code comprising a plurality of control-flow paths in the item of software including the first control-flow path, each control-flow path being associated with a respective condition which is based upon one or more respective condition variables and each control-flow path being arranged to be executed when said respective condition is satisfied, the first control-flow path being arranged to set the value of a program variable according to a predetermined first function, the method comprising: determining a second function which is based, at least in part, on the one or more condition variables upon which the condition associated with the first control-flow path is based, and which evaluates to the same value as the predetermined first function when the condition associated with the first control-flow path is satisfied by the one or more condition variables; and replacing the first control-flow path with replacement code that is not part of the decision code, wherein the replacement code comprises a first portion of code which is arranged to set the value of the program variable according to the second function irrespective of whether the condition associated with the first control-flow path is satisfied by the one or more condition variables.

There has also been described a method for decoupling a decision in an item of software from an associated first control-flow path, the decision comprising a plurality of control-flow paths including the first control-flow path, each control-flow path being associated with a respective condition which is based upon one or more respective condition variables and being arranged to be executed when said condition is satisfied, the first control-flow path being arranged to set the value of a program variable according to a predetermined first function, the method comprising: determining a second function which is based, at least in part, on the one or more condition variables upon which the condition associated with the first control-flow path is based, and which evaluates to the same value as the predetermined first function when the condition associated with the first control-flow path condition is satisfied by the one or more condition variables; and replacing the first control-flow path with replacement code that is not part of the decision, wherein the replacement code comprises a first portion of code which is arranged to set the value of the program variable according to the second function irrespective of whether the condition associated with the first control-flow path is satisfied by the one or more condition variables.

The invention claimed is:

1. A method, implemented by one or more computer hardware processors, of creating a protected item of software so as to obfuscate a condition which causes a variation in control flow through a portion of an item of software dependent on whether the condition is satisfied, wherein satisfaction of the condition is based on evaluation of one or more condition variables, the method comprising:
    modifying the item of software such that the control flow through said portion is not dependent on whether the condition is satisfied;
    inserting a plurality of identity transformations into expressions in said portion of the modified item of software, wherein the plurality of identity transformations are defined and inserted such that, in the absence of tampering, the plurality of identity transformations maintain the results of the expressions when the condition is satisfied and such that the plurality of identity transformations alter the results of the expressions when the condition is not satisfied, wherein each of the plurality of identity transformations is directly or indirectly dependent on at least one of the one or more condition variables; and
    saving a result of the modifying and inserting steps as the protected item of software.

2. The method of claim 1 further comprising defining a plurality of new variables.

3. The method of claim 2 wherein a value assigned to at least one of the new variables is not based, directly or indirectly, on any of the one or more condition variables.

4. The method of claim 2 wherein a value assigned to at least one of the new variables is a constant value.

5. The method of claim 2 wherein a value assigned to at least one of the new variables is based on a program variable of the item of software, said program variable being different than the one or more condition variables.

6. The method of claim 2 wherein a value assigned to at least one of the new variables is based, directly or indirectly, on at least one of the one or more condition variables.

7. The method of claim 6 wherein each of the one or more condition variables is used, directly or indirectly, to assign a value to at least one of the new variables.

8. The method of claim 7 wherein at least one identity transformation is dependent on at least one of the new variables.

9. The method of claim 7 further comprising:
    reformulating the condition to produce a new condition, the new condition being based on at least one of the new variables, wherein the new condition is satisfied when the condition is satisfied, and wherein the new condition is not satisfied when the condition is not satisfied; and modifying the item of software such that at least part of the control flow is dependent on whether the new condition is satisfied.

10. The method of claim 6 further comprising modifying said portion of the item of software such that at least one instance of at least one of the one or more condition variables is replaced by an equivalent expression based on at least one of the new variables.

11. The method of claim 2 further comprising:
identifying a code block in the item of software where at least one of the one or more condition variables is assigned a value that is subsequently used to test whether the condition is satisfied; and
assigning values to at least some of the new variables in said code block.

12. The method of claim 1 wherein the item of software comprises an IF-THEN statement including an IF section of code comprising the condition and a THEN section of code arranged to be executed in response to the condition being satisfied, and wherein modifying the item of software comprises removing the IF-THEN statement such that the modified item of software always executes the THEN section of code regardless of whether the condition is satisfied.

13. The method of claim 1 wherein the item of software comprises an IF-THEN-ELSE statement including an IF section of code comprising the condition, a THEN section of code arranged to be executed in response to the condition being satisfied and an ELSE section of code arranged to be executed in response to the condition not being satisfied, and wherein modifying the item of software comprises removing the IF-THEN-ELSE statement such that the modified item of software always executes the THEN section of code regardless of whether the condition is satisfied.

14. The method of claim 1 wherein the item of software comprises an IF-THEN-ELSE statement including an IF section of code comprising the logical complement of the condition, a THEN section of code arranged to be executed in response to the condition not being satisfied and an ELSE section of code arranged to be executed in response to the condition being satisfied, and wherein modifying the item of software comprises removing the IF-THEN-ELSE statement such that the modified item of software always executes the ELSE section of code regardless of whether the condition is satisfied.

15. The method of claim 1 wherein at least one of the identity transformations is a multiplication identity transformation which, in the absence of tampering, evaluates to 1 when the condition is satisfied and does not evaluate to 1 when the condition is not satisfied, wherein said multiplication identity transformation may be inserted into an expression by multiplying a variable in the expression by the multiplication identity transformation.

16. The method of claim 1 wherein at least one of the identity transformations is an addition identity transformation which, in the absence of tampering, evaluates to 0 when the condition is satisfied and does not evaluate to 0 when the condition is not satisfied, wherein said addition identity transformation may be inserted into an expression by adding the addition identity transformation to a variable in the expression.

17. The method of claim 1 further comprising:
identifying all control flow paths through said portion of the modified item of software; and
for each identified control flow path, taking into account values of variables along that control flow path so as to identify respective identity transformations for insertion into expressions in that control flow path.

18. The method of claim 1 further comprising identifying a condition in the item of software to be obfuscated.

19. The method of claim 1 further comprising inserting a branch point in the control flow in said portion of the modified item of software, the control flow path taken from said branch point being independent of whether the condition is satisfied.

20. The method of claim 1 wherein, subsequent to said portion of the modified item of software, the control flow through the modified item of software may vary dependent on whether the condition is satisfied.

21. The method of claim 1, wherein:
(a) the protected item of software includes an obfuscation of a first condition which causes a variation in control flow through a first portion of the item of software dependent on whether the first condition is satisfied; and
(b) the protected item of software includes an obfuscation of a second condition which causes a variation in control flow through a second portion of the item of software dependent on whether the second condition is satisfied.

22. The method of claim 21 wherein there is at least a partial overlap between said first and second portions of the item of software.

23. The method of claim 21 wherein the second condition is the logical complement of the first condition.

24. One or more tangible non-transitory computer readable media comprising computer program code stored thereon, the program code, when executed by a computer processor, causes the computer processor to create a protected item of software so as to obfuscate a condition which causes a variation in control flow through a portion of the item of software dependent on whether the condition is satisfied, wherein satisfaction of the condition is based on evaluation of one or more condition variables, by:
modifying the item of software such that the control flow through said portion is not dependent on whether the condition is;
inserting a plurality of identity transformations into expressions in said portion of the modified item of software, wherein the plurality of identity transformations are defined and inserted such that, in the absence of tampering, the plurality of identity transformations maintain the results of the expressions when the condition is satisfied and such that the plurality of identity transformations alter the results of the expressions when the condition is not satisfied, wherein each of the plurality of identity transformations identity is directly or indirectly dependent on at least one of the one or more condition variables; and
saving a result of the modifying and inserting steps as the protected item of software.

25. An apparatus for creating a protected item of software comprising:
an input for receiving an item of software to be protected, the item of software comprising a condition which causes a variation in control flow through a portion of the item of software dependent on whether the condition is satisfied, wherein satisfaction of the condition is based on evaluation of one or more condition variables;
an output for outputting a protected item of software; and
a computer hardware processor configured to produce the protected item of software from the item of software to be protected by:

modifying the item of software such that the control flow through said portion is not dependent on whether the condition is satisfied to thereby obtain a modified item of software;

inserting a plurality of identity transformations into expressions in said portion of the modified item of software, wherein the plurality of identity transformations are defined and inserted such that, in the absence of tampering, the plurality of identity transformations maintain the results of the expressions when the condition is satisfied and such that the plurality of identity transformations alter the results of the expressions when the condition is not satisfied, wherein each of the plurality of identity transformations identity transformation is directly or indirectly dependent on at least one of the one or more condition variables; and saving a result of the modifying and inserting steps as the protected item of software.

* * * * *